US008656175B2

(12) United States Patent
Haga et al.

(10) Patent No.: US 8,656,175 B2
(45) Date of Patent: Feb. 18, 2014

(54) SECURE PROCESSING DEVICE, SECURE PROCESSING METHOD, ENCRYPTED CONFIDENTIAL INFORMATION EMBEDDING METHOD, PROGRAM, STORAGE MEDIUM, AND INTEGRATED CIRCUIT

(75) Inventors: Tomoyuki Haga, Nara (JP); Taichi Sato, Osaka (JP); Rieko Asai, Osaka (JP)

(73) Assignee: Panasonic Corporation, Osaka (JP)

( * ) Notice: Subject to any disclaimer, the term of this patent is extended or adjusted under 35 U.S.C. 154(b) by 1379 days.

(21) Appl. No.: 12/091,250

(22) PCT Filed: Oct. 24, 2006

(86) PCT No.: PCT/JP2006/321090
§ 371 (c)(1),
(2), (4) Date: Apr. 23, 2008

(87) PCT Pub. No.: WO2007/052491
PCT Pub. Date: May 10, 2007

(65) Prior Publication Data
US 2009/0132830 A1 May 21, 2009

(30) Foreign Application Priority Data

Oct. 31, 2005 (JP) ................................. 2005-316105

(51) Int. Cl.
*H04L 9/16* (2006.01)

(52) U.S. Cl.
USPC ............. 713/176; 713/170; 713/178; 380/28; 380/29; 380/30

(58) Field of Classification Search
USPC ........................ 713/170, 176, 178; 380/28–30
See application file for complete search history.

(56) References Cited

U.S. PATENT DOCUMENTS 5,497,423 A * 3/1996 Miyaji ............................. 380/30
6,278,783 B1 * 8/2001 Kocher et al. ................. 380/277

(Continued)

FOREIGN PATENT DOCUMENTS

| JP | 2002-519722 | 7/2002 |
| JP | 2002-536911 | 10/2002 |
| JP | 2002-368735 | 12/2002 |

OTHER PUBLICATIONS

International Search Report issued Jan. 23, 2007 in the International (PCT) Application of which the present application is the U.S. National Stage.

(Continued)

*Primary Examiner* — Yin-Chen Shaw
(74) *Attorney, Agent, or Firm* — Wenderoth, Lind & Ponack, L.L.P.

(57) ABSTRACT

When performing secure processing using confidential information that needs to be confidential, the secure processing device according to the present invention prevents the confidential information from being exposed by an unauthorized analysis such as a memory dump. A signature generation device that provides a message M with a signature by using a signature key comprises: a split key storage unit that stores split secret keys obtained by splitting the signature key d into at least two, a signature key generation equation F for calculating the split secret keys to obtain the signature key d, and a signature generation equation; a signature key generation identical equation generation unit that generates a signature key generation identical equation G for obtaining the same result as the signature generation equation F, with use of an associative law, a distributive law, and a commutative law; a combined split key generation unit that generates a plurality of combined split keys that are each a result of calculating the split secret keys, and that are to be arguments for the signature key generation identical equation G; and a signature generation unit that provides the message with the signature, based on the signature key generation identical equation G and the split secret keys.

19 Claims, 18 Drawing Sheets

(56) References Cited

U.S. PATENT DOCUMENTS

| | | | |
|---|---|---|---|
| 6,658,569 B1* | 12/2003 | Patarin et al. | 713/194 |
| 7,062,043 B1* | 6/2006 | Solinas | 380/30 |
| 7,174,460 B2* | 2/2007 | Horita et al. | 713/176 |
| 7,386,131 B2* | 6/2008 | Jing et al. | 380/278 |
| 7,599,491 B2* | 10/2009 | Lambert | 380/30 |
| 2002/0164035 A1* | 11/2002 | Yokota et al. | 380/278 |
| 2005/0204129 A1* | 9/2005 | Sudia et al. | 713/158 |
| 2012/0002805 A1* | 1/2012 | Scheidt et al. | 380/28 |

OTHER PUBLICATIONS

Honda et al., "Analyzing Tamper Resistance of Digital Signature Software by Runtime Data Exhaustive Checking", SCIS, 2005 (including partial English translation).

* cited by examiner

200 SPLIT KEY IDENTIFICATION INFORMATION TABLE

| SPLIT KEY IDENTIFIER (201) | SPLIT KEY (111) |
|---|---|
| ID001 | D1 |
| ID002 | D2 |
| ID003 | D3 |
| ID004 | D4 |
| ID005 | D5 |
| ID006 | D6 |
| ID007 | D7 |
| ID008 | D8 |

SIGNATURE KEY GENERATION EQUATION F: (d1+d2+d3+d4)*(d5+d6+d7+d8)

FIG. 4

400 SPLIT KEY INFORMATION TABLE

| 401 SPLIT KEY GROUP IDENTIFIER | 402 SPLIT KEY GROUP MEMBER IDENTIFIER |
|---|---|
| MULTIPLICATION GROUP 1:MG001 | AG001, AG002 |
| ADDITION GROUP 1:AG001 | id001, id002, id003, id004 |
| ADDITION GROUP 2:AG002 | id005, id006, id007, id008 |

FIG. 5

START

↓

S501
SIGNATURE KEY GENERATION IDENTICAL EQUATION GENERATION UNIT GENERATES SIGNATURE KEY GENERATION IDENTICAL EQUATION THAT OUTPUTS THE SAME RESULT AS SIGNATURE KEY GENERATION EQUATION, USING SPLIT KEY INFORMATION TABLE

↓

S502
COMBINED SPLIT KEY GENERATION UNIT GENERATES COMBINED SPLIT KEY USING SIGNATURE KEY GENERATION IDENTICAL EQUATION AND SPLIT KEY IN SPLIT KEY STORAGE UNIT

↓

S503
SIGNATURE GENERATION UNIT GENERATES SIGNATURE S USING SIGNATURE TARGET MESSAGE M, SIGNATURE KEY GENERATION IDENTICAL EQUATION, AND COMBINED SPLIT KEY, AND OUTPUTS THE SIGNATURE S

↓

END

FIG. 9

| MG001 | {AG002}, {AG001} |
| --- | --- |
| AG001 | {id007, id006}, {id008, id005} |
| AG002 | {id002, id001}, {id004, id003} |

SIGNATURE KEY GENERATION IDENTICAL EQUATION G'
: ((d7+d6)+(d8+d5))*((d2+d1)+(d4+d3))

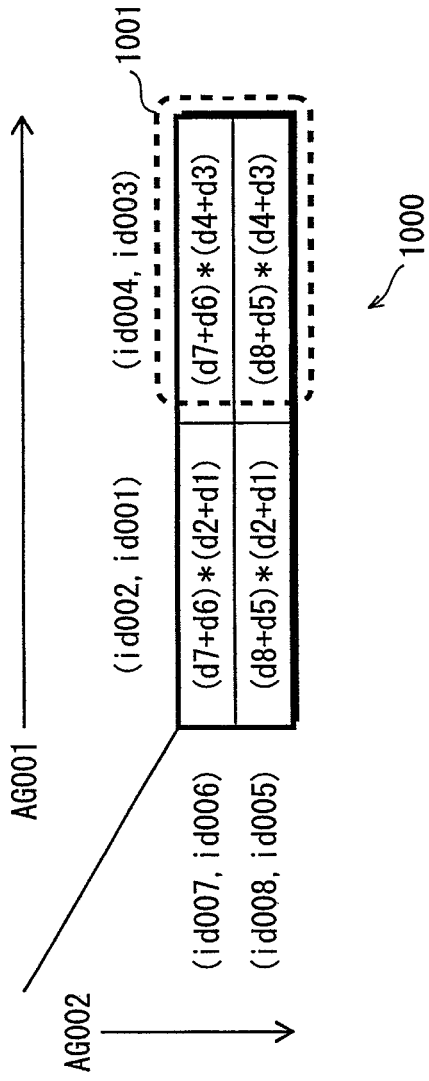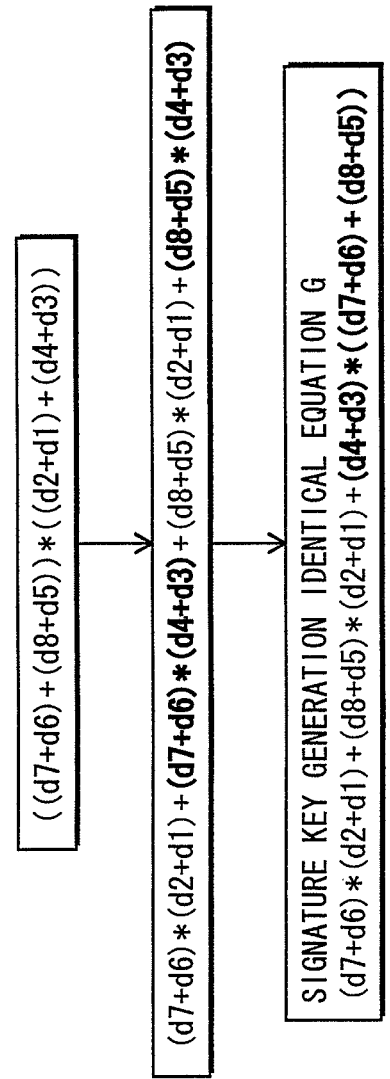

FIG. 11

600 COMBINED SPLIT KEY IDENTIFICATION INFORMATION TABLE

| COMBINED SPLIT KEY IDENTIFIER (1101) | VALUES OF COMBINED SPLIT KEYS (141) |
|---|---|
| ID001 | CD1 (=D7+D6) |
| ID002 | CD2 (=D2+D1) |
| ID003 | CD3 (=D8+D5) |
| ID004 | CD4 (=D2+D1) |
| ID005 | CD5 (=D4+D3) |
| ID006 | CD6 (=D7+D6) |
| ID007 | CD7 (=D8+D5) |

$G'(d1, d2, d3, d4, d5, d6, d7, d8)$
$= (d7+d6)*(d2+d1)+(d8+d5)*(d2+d1)+(d4+d3)*((d7+d6)+(d8+d5))$
$= (cd1*cd2)+(cd3*cd4)+cd5*(cd6+cd7)$
$= G(cd1, cd2, cd3, cd4, cd5, cd6, cd7)$

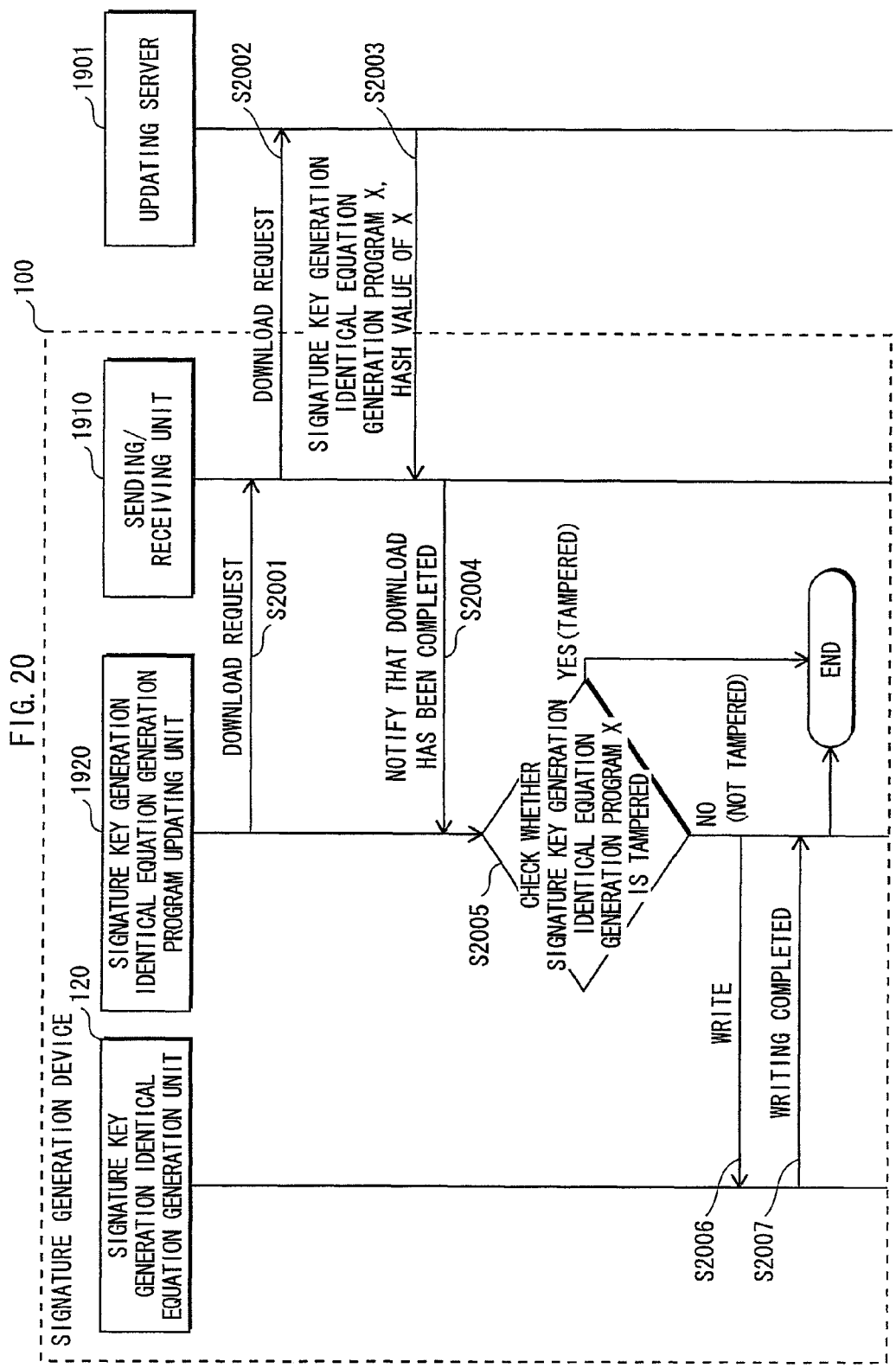

SECURE PROCESSING DEVICE, SECURE PROCESSING METHOD, ENCRYPTED CONFIDENTIAL INFORMATION EMBEDDING METHOD, PROGRAM, STORAGE MEDIUM, AND INTEGRATED CIRCUIT

TECHNICAL FIELD

The present invention relates to a technique for preventing unauthorized tampering and analysis of a program.

BACKGROUND ART

In recent years, digital signatures (hereinafter referred to as signature) have been widely used for detection of data tampering and the like. One of the methods for generating signatures is RSA (Rivest Shamir Adleman) signature generation method. In this method, a signature S is generated by performing the operation $S = M\hat{\ }d \bmod n$ by using a signature key d with respect to a signature target message S.

The above-described signature key d is information that requires protection, and such information is referred to as confidential information hereinafter. Also, in this specification, the symbol $\hat{\ }$ represents exponentiation operation, and the symbol * represents multiplication.

Here, during the processing of the above-described RSA signature generation, a value of the signature key d appears in a memory such as a RAM in a computer, or a register of a CPU. Therefore, the signature key d is at risk for being acquired in an unauthorized manner by analyzing such a memory.

As one of the techniques for preventing such illegal acquisition of the signature key d, Non-Patent Document 1 discloses a method for generating a signature without revealing the value of the signature key d to the memory.

In the method of Non-Patent Document 1, d1, d2, and d3 that satisfy a signature key generation equation $d = (d1*d2) + d3$ are respectively evaluated. Here, d1, d2 and d3 are split keys of the above described signature key, and generating the split keys from the signature key is referred to as the splitting of the signature key.

Based on the split keys (d1, d2, d3) and the signature key generation equation, operations are performed in order of $S1 = M\hat{\ }d1 \bmod n$ $S2 = S1\hat{\ }d2 \bmod n$ $S = S2 * M\hat{\ }d3 \bmod n$ With these operations, the same signature S as the RSA signature generation equation $S = M\hat{\ }d \bmod n$ can be obtained without using the signature key d. Also, during the signature generation processing, split keys (d1, d2, d3) appear in the memory instead of the signature key d. Therefore, the signature key d can be protected.

[Non-Patent Document 1] *"Tamper-Resistance Evaluation of Signature Generation Software using Runtime-Data Search Method"* Yokohama National University, Tsutomu Matsumoto, Hiroyuki Honda, SCIS 2005.

SUMMARY OF THE INVENTION

The Problems the Invention is Going to Solve

However, in the aforementioned method, the signature key generation equation is permanently fixed. Therefore, the signature key generation equation can be specified by performing a static analysis on a signature generation unit.

Furthermore, since the same split keys are used each time, the split keys can be specified by performing a dynamic analysis. The dynamic analysis is performed as follows. First, a plurality of runtime data pieces at the time of signature generation are collected while signature target data is changed each time. After the collected runtime data pieces are compared to each other to check the difference, invariant data is extracted therefrom.

The use of the split keys specified by the above-described method and the signature key generation equation makes it possible to specify the signature key, which has been problematic.

In view of the above-described problem, the present invention provides a secure processing device that conceals confidential information even when the static analysis and dynamic analysis are performed by an unauthorized analyst.

Means to Solve the Problems

In order to solve the above-described problem, the present invention provides a secure processing device that performs an operation equivalent to a secure operation performed on a message using the confidential information, and that obtains a same operation result as the secure operation, the secure processing device comprising: a storage unit that stores (i) a first confidential information generation equation for calculating the confidential information from a plurality of split confidential information pieces obtained by splitting the confidential information, the plurality of split confidential information being input to the first confidential information generation equation as arguments, and (ii) a first secure operation procedure indicating a procedure with use of the confidential information; a first generation unit operable to generate a second confidential information generation equation that is equivalent to the first confidential information generation equation, a plurality of pieces of combined information each of which is an operation result of at least two pieces of the plurality of split confidential information being input to the first confidential information generation equation as an argument; a second generation unit operable to generate, based on one or more operators included in the second confidential information generation equation, a second secure operation procedure that is equivalent to the first secure operation procedure, each of the plurality of pieces of combined information being input to the second secure operation procedure as the argument; and an executing unit operable to perform the second secure operation procedure on the message.

Effects of the Invention

With the above-described structure, the secure processing device of the present invention generates the combined information each time the secure processing is executed, and then generates and executes the second secure operation procedure, thereby obtaining the same result as the first secure operation. Therefore, instead of the confidential information, the combined information whose value differs for each secure operation appears in a memory for operations, and the second secure operation procedure is different for each time the secure processing is executed. As a result, specifying the confidential information using the static analysis and the dynamic analysis becomes difficult, thereby concealing the confidential information.

Also, it is possible that the first confidential information includes one or more operations, and the second generation unit generates the second confidential information generation equation by randomly selecting, from operations included in the first confidential information generation equation, an operation having an alternative operation that satisfies one of a commutative law, an associative law, and a distributive law, and replacing the selected operation with the alternative operation.

Furthermore, it is possible that the first confidential information generation equation includes the one or more operations, each of which includes (i) a plurality of operands and (ii) an operator indicating a type of an operation between the operands, the storage unit stores attribute information indicating a relationship between the operands and the operator that are included in the first confidential information generation equation, and the first generation unit generates the second confidential information using the attribute information.

Also, it is possible that in the first confidential information generation equation, values of arguments are input as the operands, each of the values corresponding to a different piece of the plurality of split confidential information, the attribute information indicates an operator that corresponds to a plurality of operands capable of being combined, the first generation unit concatenates the plurality of operands in the first confidential information generation equation with the operator, based on the attribute information, and the second generation unit operable to generate the plurality of pieces of combined information by combining pieces of split confidential information corresponding to the combined operands.

Furthermore, it is possible that the second confidential information generation equation includes one or more operations, each of which includes a plurality of operands and an operator indicating a type of an operation between the operands, the storage unit stores attribute information indicating a relationship between the operands and the operator that are included in the second confidential information generation equation, and the second generation unit generates the second secure operation procedure using the attribute information.

The above-described structure makes it possible to randomly generate the second confidential information generation equation that obtains the same result as the first confidential information generation equation. Therefore, specifying the confidential information by the static analysis becomes difficult.

Also, the first generation unit may further generate random number information, thereby generating the second confidential information generation equation including the random number information, the second generation unit may generate, with use of the plurality of pieces of combined information and the random number information, the second secure operation procedure indicating the operation procedure equivalent to the first secure operation procedure, based on the second confidential information generation equation, and the executing unit may perform, with use of the plurality of pieces of combined information and the random number information, the second secure operation procedure on the message.

According to the above-described structure, including random number information makes an analysis of the second confidential information generation equation difficult, thereby making it difficult to perform the static analysis of a secure operation that is performed according to the second secure operation procedure in which the random number information is used.

Also, the first generation unit may further generate, with use of the confidential information, redundant information that does not affect a result of the operation processing, thereby generating the second confidential information generation equation using the redundant information.

With the above-described structure, the use of the redundant information makes the static analysis of the second confidential information generation equation difficult.

Also, the storage unit may store dummy information that is not used by the executing unit, together with the plurality of split confidential information pieces.

With the above-described structure, it is possible to make it difficult to perform the static analysis of the secure processing based on the information stored in the storage unit.

Furthermore, it is possible that the confidential information is a signature key for generating a digital signature, and the secure operation is a signature generation operation for providing a digital signature with the message.

With the above-described structure, specifying the confidential information using the static analysis is difficult during the execution of the digital signature processing.

Also, the signature generation processing may be RSA (Rivest Shamir Adleman) signature generation processing.

With the above-described structure, specifying the confidential information using the static analysis is difficult during the execution of the RSA signature generation processing.

Furthermore, the signature generation processing may be performed using an elliptic curve digital signature method.

Also, the secure processing device may further comprise: a random number information generation unit operable to generate random number information, wherein the executing unit performs (i) processing for calculating a random value k scalar multiplication point of a base point P that is an order q of an elliptic curve on a field of definition GF(p) in the elliptic curve digital signature method, and (ii) processing that uses a value of an inverse of k on the field of definition GF (q), without directly using the random number k, but using at least two pieces of the random number information.

With the above-described structure, specifying the confidential information using the static analysis is difficult during the execution of the signature processing in an elliptic curve digital signature method.

Also, the confidential information may be a secret key of public key encryption, and the executing unit may perform, as the secure operation, processing of a public key encryption system using a public key and the secret key.

With the above-described structure, specifying the secret key using the static analysis is difficult during the execution of the secure processing using the public key encryption.

Furthermore, the public key encryption may be RSA encryption.

With the above-described structure, specifying the secret key using the static analysis is difficult during the execution of the secure processing using RSA encryption.

Also, the public key encryption may be elliptic curve encryption.

With the above-described structure, specifying the secret key using the static analysis is difficult during the execution of the secure processing using the elliptic curve encryption.

The secure processing device may further comprise: an acquiring unit operable to acquire, from outside, data for updating the first generation unit; and an updating unit operable to update the first generation unit, with use of the data for updating.

With the above-described structure, updating the first generation unit makes it difficult to specify the confidential information even when the static analysis is performed during the execution of the secure processing. Also, the numbers of split keys and combined split keys can be adjusted from outside the device. Therefore, the security strength can be flexibly set.

The secure processing device may further comprise: an acquiring unit operable to acquire, from outside, split confidential information for updating; an updating unit operable to update at least one piece of the plurality of split confidential information stored in the storage unit to the split confidential information for updating acquired by the acquiring unit.

With the above-described structure, even when the static analysis is performed during the execution of the secure processing, specifying the confidential information is difficult since the combined information is updated.

Also, the numbers of split keys and combined split keys can be adjusted from outside the device, and the security strength can be set flexibly.

The secure processing method of the present invention is a method used in a secure processing device that performs an operation equivalent to a secure operation performed on a message using the confidential information, and that obtains a same operation result as the secure operation, wherein the secure processing device comprises: a storage unit that stores (i) a first confidential information generation equation for calculating the confidential information from a plurality of split confidential information pieces obtained by splitting the confidential information, the plurality of split confidential information being input to the first confidential information generation equation as arguments, and (ii) a first secure operation procedure indicating a procedure with use of the confidential information, and the secure processing method comprises the steps of: generating a second confidential information generation equation that is equivalent to the first confidential information generation equation, a plurality of pieces of combined information each of which is an operation result of at least two pieces of the plurality of split confidential information being input to the first confidential information generation equation as an argument; generating, based on one or more operators included in the second confidential information generation equation, a second secure operation procedure that is equivalent to the first secure operation procedure, each of the plurality of pieces of combined information being input to the second secure operation procedure as the argument; and performing a secure operation on the message, according to the second secure operation procedure.

The computer program of the present invention is A computer program used in a secure processing device that performs an operation equivalent to a secure operation performed on a message using the confidential information, and that obtains a same operation result as the secure operation, wherein the secure processing device comprises: a storage unit that stores (i) a first confidential information generation equation for calculating the confidential information from a plurality of split confidential information pieces obtained by splitting the confidential information, the plurality of split confidential information being input to the first confidential information generation equation as arguments, and (ii) a first secure operation procedure indicating a procedure with use of the confidential information, and the computer program comprises the steps of: generating a second confidential information generation equation that is equivalent to the first confidential information generation equation, a plurality of pieces of combined information each of which is an operation result of at least two pieces of the plurality of split confidential information being input to the first confidential information generation equation as an argument; generating, based on one or more operators included in the second confidential information generation equation, a second secure operation procedure that is equivalent to the first secure operation procedure, each of the plurality of pieces of combined information being input to the second secure operation procedure as the argument; and performing a secure operation on the message, according to the second secure operation procedure.

The storage medium of the present invention is a recording medium that is computer-readable, and that stores the computer program.

The integrated circuit of the present invention is an integrated circuit that performs an operation equivalent to a secure operation performed on a message using the confidential information, and that obtains a same operation result as the secure operation, the integrated circuit comprising: a storage unit that stores (i) a plurality of split confidential information pieces obtained by splitting the confidential information, (ii) a first confidential information generation equation for calculating the confidential information with use of the plurality of split confidential information pieces that are input to the first confidential information generation equation as arguments, and (iii) a first secure operation procedure indicating a procedure with use of the plurality of split confidential information pieces; a combined information generation unit operable to generate a plurality of pieces of combined information, each of which is obtained by performing an operation on at least two or more pieces of the split confidential information; a first generation unit operable to generate a second confidential information generation equation that is equivalent to the first confidential information generation equation, and that takes the plurality of pieces of combined information as arguments; a second generation unit operable to generate, based on one or more operators included in the second confidential information generation equation, a second secure operation procedure that is equivalent to the first secure operation procedure, and that takes the plurality of pieces of combined information as the arguments; and an executing unit operable to perform the second secure operation procedure on the message.

With the above-described structure, the same result as the first secure operation is obtained by generating the combined information each time the secure processing is executed, and generating and executing the second secure operation procedure. Therefore, instead of the confidential information, the combined information (hereinafter referred to as combined information) whose value differs for each secure operation appears in a memory for operations, and the second secure operation procedure is different for each time the secure processing is executed. As a result, specifying the confidential information using the static analysis becomes difficult, thereby concealing the confidential information.

An encrypted confidential information embedding method of the present invention is a method for encrypting and embedding confidential information in a secure processing device that performs an operation using the confidential information, the encrypted confidential information embedding method comprising the steps of: encrypting the confidential information, with use of an encrypting apparatus that converts the confidential information to a state of being difficult to be analyzed; and embedding the encrypted confidential information in the secure processing device, with use of an encrypted information writing apparatus.

With the above-described structure, the confidential information is prevented from being exposed by encrypting and embedding the confidential information in the secure processing device.

Furthermore, it is possible that the encrypting apparatus includes an input unit operable to receive an input of a parameter used for determining a method of encrypting the confidential information, and the confidential information encryption step may include: a receiving step in which the input unit receives the parameter, and an encryption step for encrypting the confidential information, using an encryption method determined by the parameter.

With the above-described structure, a parameter for determining an encryption method of the confidential information is given from outside, which makes it possible to set the security strength flexibly.

Also, the parameter may be a number of split pieces of the confidential information, and the encryption step may include a splitting step for splitting the confidential information into at least two pieces of split confidential information, based on the number of split pieces of confidential information.

The encryption step may further include an equation generation step for generating, based on the number of split pieces of confidential information, a first confidential information generation equation including a number of terms that is at least as many as the number of split pieces of confidential information, and in the splitting step, the confidential information may be split in a manner that the confidential information is calculated from the first confidential information generation equation.

With the above-described structure, the number of split confidential information pieces can be adjusted from outside the device, which makes it possible to set the security strength flexibly.

Also, the parameter may be a first confidential information generation equation, and the encryption step may include a splitting step for splitting the confidential information into at least two pieces of split confidential information in a manner that the confidential information is calculated from the first confidential information generation equation.

With the above-described structure, the first confidential information generation equation is given from outside the device, which makes it possible to set the security strength flexibly.

Furthermore, it is possible that the confidential information is a secret key issued from a key issuing authority, and the encrypted confidential information embedding method may further include: an encryption step in which the key issuing authority encrypts the secret key with a secret key of the key issuing authority; and a verification step in which the encrypting apparatus decrypts the encrypted secret key with use of a public key and verifies the resultant decrypted secret key, wherein the confidential information encryption step encrypts the verified secret key, and the embedding step may include: a binary conversion step for converting, to binary data, the encrypted confidential information that has been encrypted by the encrypting apparatus; and a binary data embedding step for embedding the binary data in the secure processing device that has a function of calculating with use of the encrypted confidential information and obtaining the same operation result as when the operation using the confidential information is performed.

With the above-described structure, the secret key that is provided from a key issuing authority to a supplier is protected from being tapped and tampered during the course of the providing and receiving of the secret key.

BRIEF DESCRIPTION OF THE DRAWING

FIG. 4 is a diagram showing a split key information table in the first embodiment of the present invention;

FIG. 5 is a flowchart showing an outline of signature generation in the first embodiment of the present invention;

FIG. 9 is a diagram showing a split key information table after the random shuffle processing and the random grouping processing in the first embodiment of the present embodiment;

FIG. 10 is a diagram showing the concept of identical equation generation processing using a matrix in the first embodiment of the present invention;

FIG. 11 is a diagram showing a combined split key identification information table in the first embodiment of the present invention;

FIG. 20 is a flowchart showing the update of the signature key generation identical equation generation program in the fourth embodiment of the present invention.

| Description of Characters | |
|---|---|
| 10 | Message M |
| 20 | Signature key D |
| 21 | Signature key generation equation F |
| 22 | Split key generation device |
| 30 | Signature S |
| 100 | Signature generation device |
| 110 | Split key storage unit |
| 120 | Signature key generation identical equation generation unit |
| 121 | Signature key generation identical equation G |
| 130 | Combined split key generation unit |
| 140 | Combined split key storage unit |
| 150 | Signature generation unit |
| 200 | Split key identification information table |

-continued

Description of Characters

| | |
|---|---|
| 201 | Split key identifier |
| 1000 | Matrix |
| 1001 | Combining part selection unit |
| 1900 | Network |
| 1901 | Updating server |
| 1902 | Signature key generation identical equation generation program for update purposes |
| 1903 | Tamper detection value of the signature key generation identical equation generation program for update purposes |
| 1910 | Sending/receiving unit |
| 1920 | Signature key generation identical equation generation program updating unit |

DETAILED DESCRIPTION OF THE INVENTION

The following describes the embodiments of the present invention, with reference to diagrams.

First Embodiment

The following is a description of a secure processing device according to the first embodiment of the present invention that performs secure processing using confidential information, using an example of a signature generation device that generates a signature with use of a signature key.

In a case of generating a signature S for a message M that is received, based on a signature generation equation $S=M^d \mod n$, the signature generation device according to one embodiment of the present invention generates the signature by showing split keys in a memory instead of showing a signature key d in the memory directly, and also dynamically changes a generation procedure of the split keys, values of the split keys, and a generation procedure of the signature each time the signature generation device generates a signature.

With the above-described processing, the signature key d that is confidential information is concealed from a static analysis and a dynamic analysis by an unauthorized analyst.

<Structure>

Figure 1:
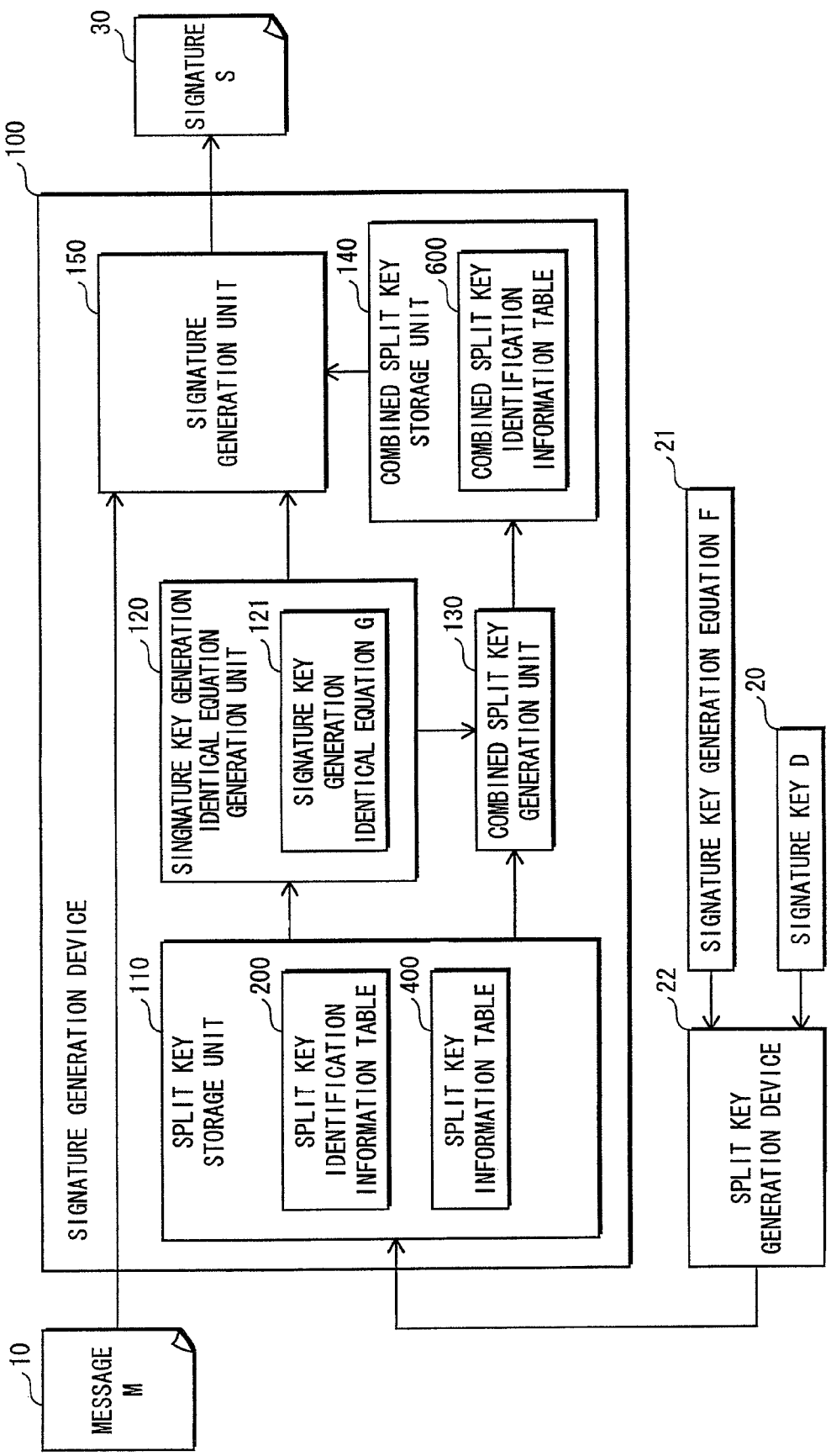
FIG. 1 is a diagram showing the general structure of a signature generation device in a first embodiment of the present invention.

FIG. 1 is a diagram showing the general structure of a signature generation system including a signature generation device 100 in the first embodiment of the present invention.

The signature generation system includes a split key generation device 22 that generates the below-described split keys from a signature key D, and the signature generation device 100 that generates signatures with use of the split keys.

The message M10 is signature target data that is to be input to the signature generation device 100. Note that the message M10 in FIG. 1 is input to the signature generation device 100 from outside. However, the message M10 may be data generated in the signature generation device 100, or also a program code or data that is stored in the memory of the signature key generation device 100.

A signature key D20 is secret key information used for signature generation, and to be protected from an unauthorized analysis. Specifically, in a case of RSA signature generation using a public key encryption system, the secret key information is a variable d in the RSA signature generation operation $M^d \mod n$ where the product of a prime number p and a prime number q is denoted by n, and a signature key D20 is assigned to the variable d.

Figures 2, 3:
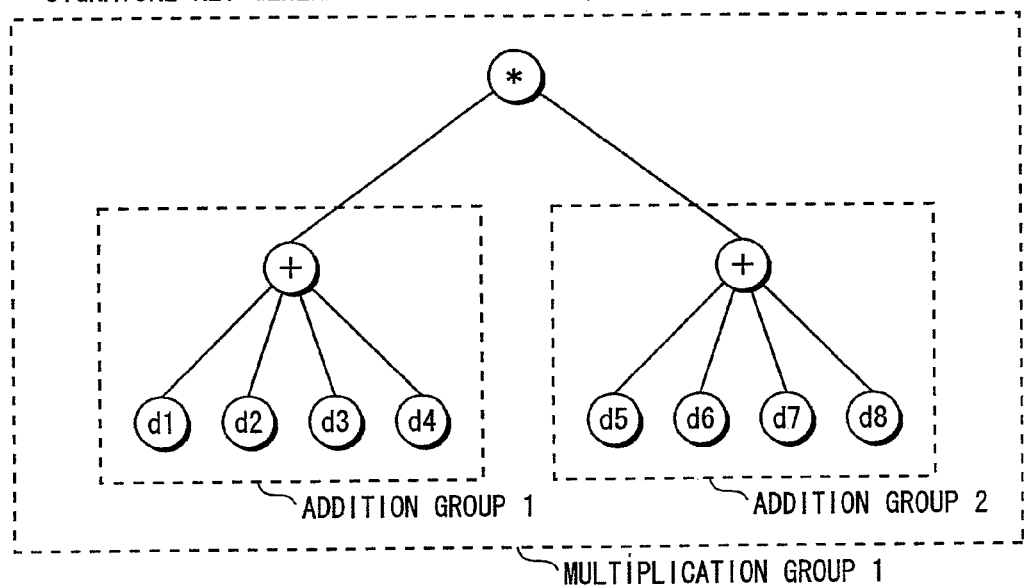
FIG. 2 is a diagram showing the structure of a split key identification information table in the first embodiment of the present invention.
FIG. 3 is a diagram conceptually describing, using a tree structure, a signature key generation equation in the first embodiment of the present invention.

Split keys 111 (D1, D2, D3 ..., Dn) shown in FIG. 2 are the keys obtained by splitting a value of the signature key D20 in advance, based on the signature key generation equation F21, so that the value of the signature key D20 does not appear in the memory at the time of the signature generation. Here, the signature key generation equation F21 and split keys 111 (D1, D2, D3, Dn) have a relationship in which the value of the signature key D20 can be obtained by calculating the signature key generation equation F21 with use of the split keys 111 (D1, D2, D3, Dn).

The following describes the split key generation device 22 and the signature generation device 100 in the stated order.

(1) Split Key Generation Device 22

The split key generation device 22 receives input of the signature key generation equation F21 and the signature key D20 from outside, generates a split key identification information table 200 and a split key information table 400 based on the signature key generation equation F21 and the signature key D20, and writes the split key identification information table 200 and the split key information table 400 in a split key storage unit 110 of the signature generation device 100 that is described below.

Specifically, the split key generation device 22 is a computer system including a microprocessor, a ROM, a RAM, a hard disk unit, a display unit, a keyboard, a mouse and the like. A computer program is stored either in the RAM or in the hard disk unit. The split key generation device 22 achieves its functions by the microprocessor operating in accordance with the computer program that is read into the RAM.

Here, the signature key generation equation F21 is assumed to be the following equation in which the arguments are 8 variables (d1-d8).

$$F(d1,d2,d3,d4,d5,d6,d7,d8)=(d1+d2+d3+d4)*(d5+d6+d7+d8)$$

Assume here that the split key D1 is assigned to the variable d1, the split key D2 is assigned to the variable d2, and in the same manner, the split keys D3-D8 are respectively assigned to the variables d3-d8.

The signature key generation equation F21 is input to the split key generation device 22 as the split key information table 400 shown in FIG. 4. Preceding the description of the split key information table 400, the expression form of the signature key generation equation F21 is described with reference to FIG. 3.

FIG. 3 conceptually describes the signature key generation equation F21 "$F(d1,d2,d3,d4,d5,d6,d7,d8)=(d1+d2+d3+d4)*(d5+d6+d7+d8)$" with use of a tree structure.

The variables d1, d2, d3, and d4 are associated with group information that is referred to as an addition group 1.

Here, the group information is attribute information indicating what kind of operation (addition and multiplication, for example) is performed in the signature generation equation F21, between operands (d1-d8) and other operands. Also, operands that constitute the above-described group, and groups smaller than the above-described group are referred to as members.

For example, in an "addition group", each of the members is calculated with use of an operator "+ (addition)", and in a "multiplication group", each of the members is calculated with use of an operator "* (multiplication)".

Note that the attribute information indicating a relationship of what kind of operators are used for the calculation between the groups that are composed of a plurality of variables, and between the group and other variables, are also referred to as group information.

As described above, a relationship between the variables and the signature key generation equation F21 can be identified when the attribute information referred to as group information is provided to the variables.

Specifically, each of the members in the "addition group" is calculated using the operator "+ (addition)", as described above. Therefore, an addition group 1 represents the expression d1+d2+d3+d4. Also, the variables d5, d6, d7, and d8 are associated with the group information referred to as an addition group 2. The addition group 2 represents the expression d5+d6+d7+d8 in the same manner as the case of the addition group 1. Furthermore, the addition group 1 and the addition group 2 are associated with the group information that is referred to as a multiplication group 1.

As described above, the group information referred to as the "multiplication group" indicates that each member in the group is calculated using the operator "* (multiplication)". The multiplication group 1 shows a relationship in which the addition group 1 and the addition group 2 are multiplied, and expresses the signature key generation equation F21 that is (d1+d2+d3+d4)*(d5+d6+d7+d8).

The following describes the split key information table 400 that specifically shows, as information, the structure of the signature key generation equation F21 shown in FIG. 3.

As shown in FIG. 4, the split key information table 400 is composed of split key group identifiers 401 and split key group member identifiers 402.

The split key group identifiers 401 identify the above-described groups, and the split key group member identifiers identify members in each of the groups.

In FIG. 4, the addition group 1 is allocated "AG001" as the split key group identifier 401. Here, as shown in FIG. 3, the members in the group "AG001" are the variables d1, d2, d3, and d4. Therefore, "id001", "id002", "id003", and "id004" that identify the corresponding variables are registered in the split key information table 400 as the split key group member identifiers 402.

Also, the addition group 2 is allocated "AG002" as the split key group identifier 401. Here, the members in the group "AG002" are the variables d5, d6, d7, and d8. Therefore, "id005", "id006", "id007", and "id008" are registered in the split key information table 400 as the split key group member identifiers 402.

Also, the multiplication group 1 is allocated "MG001" as the split key group identifier 401. The members in the group "MG001" are the addition groups 1 and 2. Therefore, "AG001" and "AG002" that are the split key group identifiers 401 of the addition groups 1 and 2 are registered in the split key information table 400 as the split key group member identifiers 402.

Using such a data structure as described above, a signature key generation identical equation generation unit 120 refers to the split key identification information table 200 and the split key information table 400, and thereby learns the structure of the signature key generation equation F21.

The following describes processing in which the split key generation device 22 splits the signature key D into a plurality of split keys based on the signature generation equation F21.

In the present embodiment, the number of input variables of the signature key generation equation F21 is 8. Therefore, the split key generation device 22 splits the signature key D20 into 8 split keys D1-D8.

Note that, for D1-D8, values that satisfy F(D1,D2,D3,D4, D5,D6,D7,D8)=D are randomly selected.

Here, the split keys Dn (n:1-8) are assigned to the arguments dn of the signature key generation equation. In other words, the split key D1 is assigned to the argument d1 of the signature key generation equation F21. In the same manner, the split key D2 is assigned to the argument d2, and the split keys D3-D8 are assigned to the arguments d3-d8 respectively.

As one example of a method for calculating the split keys D1-D8 from the signature key D based on the signature key generation equation F21, the split key generation device 22 calculates the split keys D1-D8 by making the unit of operation smaller, starting from the outermost operation performed in the signature key generation equation F21.

Specifically, the split key generation device 22 first selects random values R1 and R2 that satisfy D=R1*R2.

Next, the split key generation device 22 selects random values D1, D2, D3, and D4 that satisfy R1=(D1+D2+D3+D4), and then selects random values D5, D6, D7, and D8 that satisfy R2=(D5+D6+D7+D8).

The split key generation device 22 allocates, to each of the selected split keys D1-D8, a different split key identifier 201 that is identification information for identifying the corresponding split keys.

For example, the split key generation device 22 allocates "ID001" as the split key identifier 201 to the split key D1, "ID002" as the split key identifier 201 to the split key D2, and in the same manner, "ID003", "ID004", "ID005", "ID006", "ID007", and "ID008" as the split key identifiers 201 to the split keys D3, D4, D5, D6, D7, and D8 respectively.

The split key generation device 22 generates the split key identification information table 200 shown in FIG. 2 where the split key identifiers 201 are associated with the split keys 111, and writes the split key identification table 200 in the split key storage unit 110 of the signature generation device 100 that is described below.

(2) Signature Generation Device 100

As shown in FIG. 1, the signature generation device 100 includes the split key storage unit 110, the signature key generation identical equation generation unit 120, a combined split key generation unit 130, a combined split key storage unit 140, and a signature generation unit 150.

The signature generation device 100 is a computer system including a microprocessor, a ROM, a RAM, a hard disk unit, a display unit, a keyboard, a mouse and the like. A computer program is stored either in the RAM or in the hard disk unit. The signature generation device 100 achieves its functions by the microprocessor operating in accordance with the computer program that is read into the RAM.

The split key storage unit 110 is a storage device such as a memory or a hard disk, and stores the split key identification information table 200 and the split key information table 400 that are written by the split key generation device 22.

The signature key generation identical equation generation unit 120 generates a signature key generation identical equation 121 that is an equation identical to the signature key generation equation F21. Here, the stated "identical" means a relationship where an equation is equivalent to another in operations, and where a result of the operations is the same.

The following is a detailed description, with reference to figures, of a method in which the signature key generation identical equation generation unit 120 dynamically generates, from the signature key generation equation F21 and the signature key D20, (i) a signature key generation identical equation G121 that is an equation identical to the signature key generation equation F21 and (ii) a combined split key 141 that is described below with FIG. 11.

Hereinafter, the descriptions are provided by taking RSA signature generation as an example.

FIG. 5 is a flowchart showing an outline of processing of dynamically generating the signature generation identical equation G121 and the below-described combined split key 141, thereby generating and outputting a signature S30. Note that each step of FIG. 5 is described in detail, with reference to the flowcharts of FIGS. 6-11.

In FIG. 5, the signature key generation identical equation generation unit 120 first reads the split key information table 400 stored in the split key storage unit 110, and generates the signature key generation identical equation G121 that outputs the same result as the signature key generation equation F21 (step S501).

Then, the signature key generation identical equation generation unit 120 generates the combined split key 141 whose value is different from each of the split keys 111 by performing a join operation on the split keys 111 stored in the split key storage unit 110, based on the signature key generation identical equation G121 that has been generated in step S501, and writes the generated combined split key 141 into the combined split key storage unit 140 (step S502).

Subsequently, the signature generation unit 150 calculates, the signature S30 whose operation result is the same as $M^{\wedge}d$ mod n, with use of the signature target message M10, the signature key generation identical equation G121, and the combined split key 141, in a manner that does not reveal the value of the signature key D20, and outputs the signature S30 to complete the signature generation processing (step S503).

Here, the notation "$A^{\wedge}B$" in the description represents A raised to the $B^{th}$ power, and the notation "A mod B" represents a residue of when A is split by the natural number B.

Figure 6:
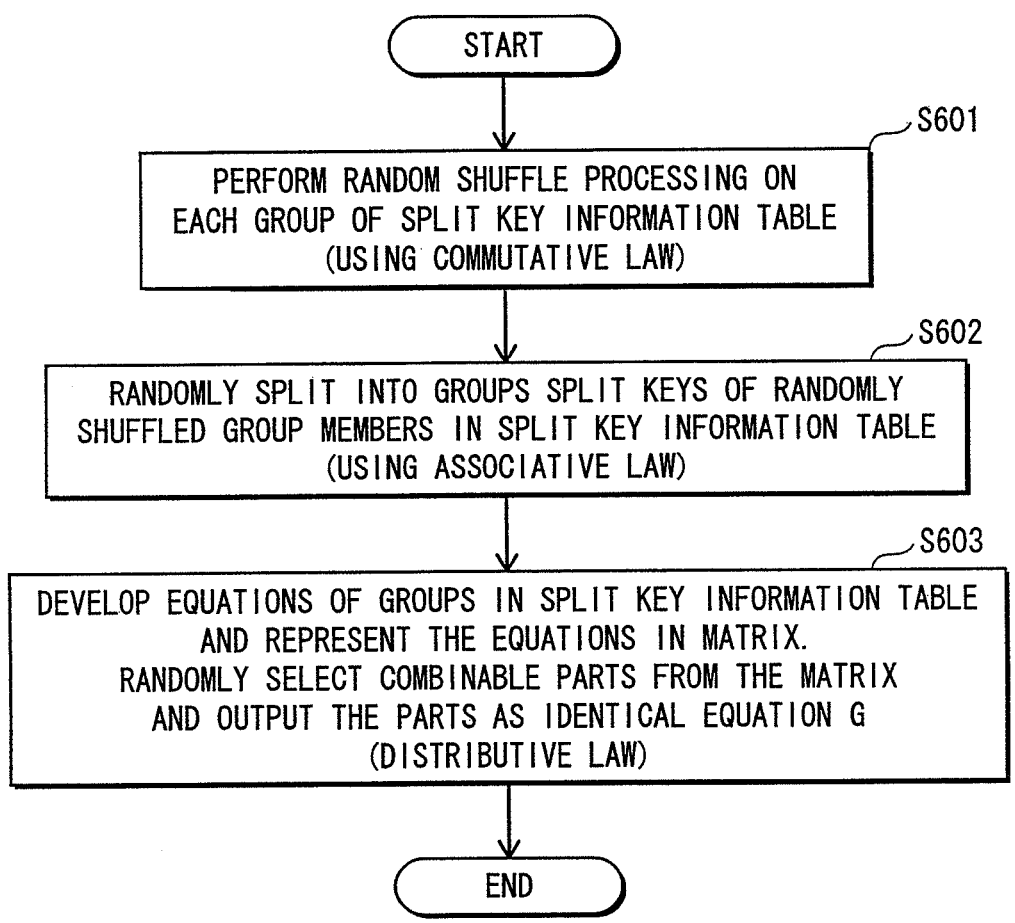
FIG. 6 is a flowchart showing the processing of generating identical equations in the first embodiment of the present invention.

The following is a detailed description of the above-described step S501 in FIG. 5, with reference to FIG. 6.

First, the signature key generation identical equation generation unit 120 reads the split key information table 400 stored in the split key storage unit 110, and performs random shuffle processing that randomly rearrange the array of members in each group (step S601). The detailed flow of the random shuffle is described below with reference to FIG. 7.

Then, the signature key generation identical equation generation unit 120 randomly splits the members of each group in the split key information table 400, which have been randomly shuffled, into groups (step S602). The detailed description of the processing for random grouping is provided below, with reference to FIG. 8 and FIG. 9.

Next, the signature key generation identical equation generation unit 120 develops the equation of each of the groups that have been randomly split in step S602, transforms the groups into a data structure referred to as a "matrix representation" that is described below, randomly selects parts to be combined in the developed groups, and combines the selected parts. As a result, the signature key generation identical equation 121 that is an equation identical to the signature key generation equation F21 is generated, which is output by the signature key generation identical equation generation unit 120 (step S603). The step S603 is described below with reference to FIG. 10.

Figure 7:
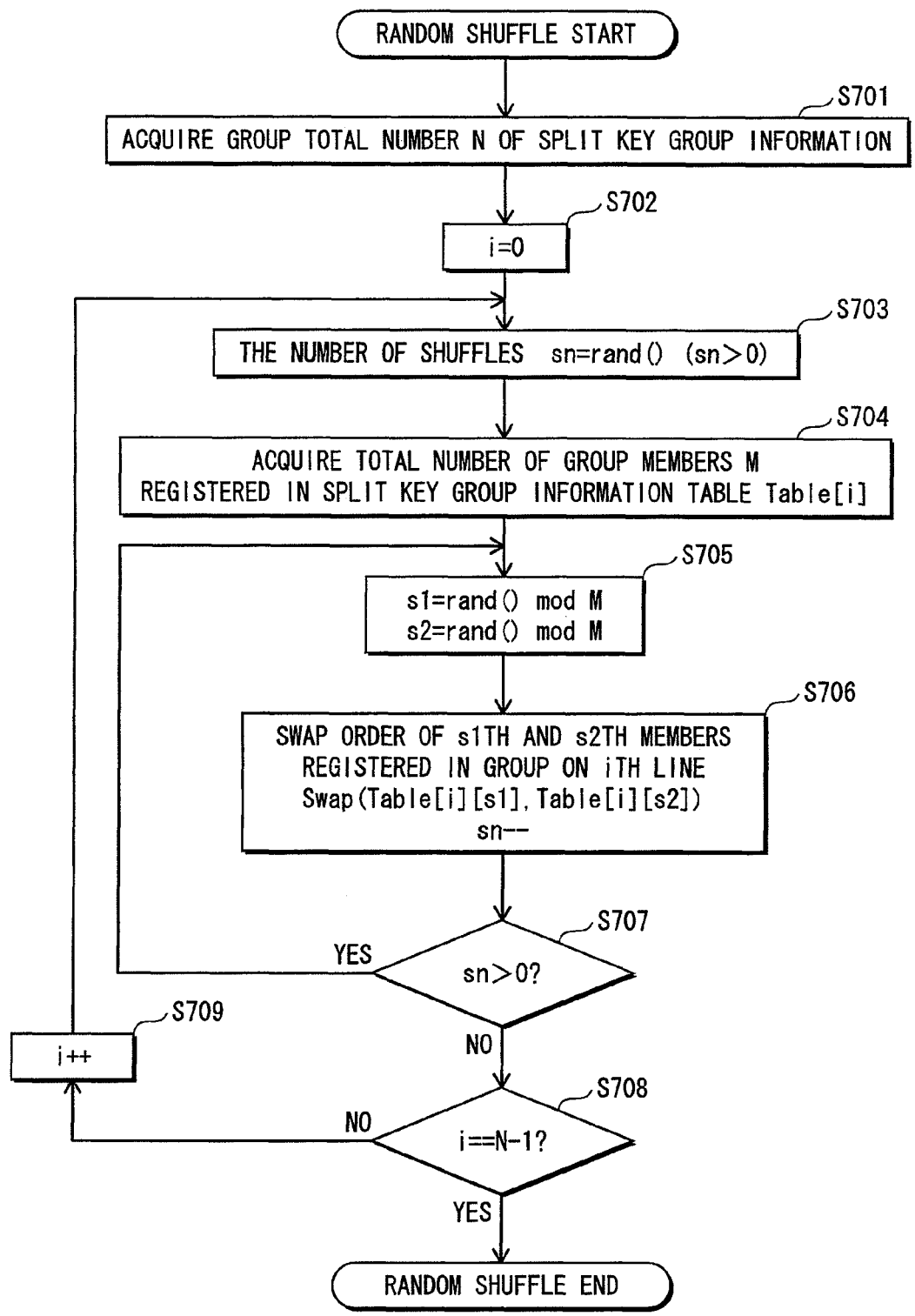
FIG. 7 is a flowchart showing the random shuffle processing using a commutative law in the first embodiment of the present invention.

The following describes in detail the random shuffle processing of the members in the split key groups in step S601, with reference to FIG. 7.

Note that the "random shuffle" described in the present embodiment means to transform an expression, for example the expression d1+d2+d3+d4, into an identical expression using the commutative law. Also, in a case of addition and such, a relationship in which the calculation result of the expression 1+2+3 and the calculation result of the expression 3+2+1 are the same, namely a relationship in which a calculation result does not change even though the order of operands in an expression is changed, is described as "the commutative law is established".

First, the signature key generation identical equation generation unit 120 acquires a group total number N of the split key information table 400 stored in the split key storage unit 110 (step S701).

Here, the split key information table 400 is assumed to be expressed as a two-dimensional array table. Also, Table[n][m] corresponds to the split key group member identifier 402 in FIG. 4, and indicates a split key group identifier that belongs to a group listed on the $n^{th}$ line from the top and on the $m^{th}$ from the left. Also, if described as just Table[n], it indicates the split key group identifiers that belong to a group on the $n^{th}$ line from the top.

Specifically, with use of the above-described Table, the split key information table 400 shown in FIG. 4 is expressed as follows.

Table[0]={AG001,AG002},

Table[1]={id001,id002,id003,id004},

Table[2]={id005,id006,id007,id008}

Note that each index of the Table starts from 0 in this example and the examples hereinafter.

The group total number N is the number of groups such as the addition group, the multiplication group, and corresponds to a value obtained by adding 1 to the maximum value of n.

In the case of the split key information table 400 shown in FIG. 4, the group total number N is 3.

Next, the signature key generation identical equation generation unit 120 initializes a variable i to 0 (step S702).

Here, the i is a variable that indicates at which position from the beginning the split key group is currently targeted for shuffling.

Next, the signature key generation identical equation generation unit 120 generates a value of a random number and assigns the value to a variable sn that counts the number of shuffles (step S703).

Here, the shuffle count sn is a variable that indicates how many times the split key groups are to be shuffled. When a random number is used as the shuffle count sn, the shuffle count can be dynamically set, resulting in dynamically generating the signature key generation identical equation.

Then, the signature key generation identical equation generation unit 120 acquires the number of members registered in Table[i], namely the number of members M registered in the $i^{th}$ group (step S704).

Subsequently, the signature key generation identical equation generation unit 120 generates two random integers equal to 0 or more and less than M, and assigns the generated random integers to variables s1 and s2 respectively (step S705).

Here, when random integers are used as s1 and s2, the positions of members targeted for shuffling can be dynamically set, resulting in dynamically generating the signature key generation identical equation.

Next, the signature key generation identical equation generation unit 120 switches the values of Table[i][s1] and Table[i][s2] and decrements the shuffle count sn (step S706).

In other words, the signature key generation identical equation generation unit 120 switches $s1^{th}$ and $s2^{th}$ elements that belong to $i^{th}$ group, and decrement the shuffle count sn by 1.

Then, whether sn>0 or not, namely, for $i^{th}$ split key group that is currently targeted for shuffling, whether the remaining shuffle count is zero or not is judged (step S707).

When a result of the judgement in step S707 is "YES", the signature key generation identical equation generation unit 120 goes back to step S705 to continue shuffling.

When a result of the judgement in step S707 is "NO", the signature key generation identical equation generation unit 120 judges whether or not i is equivalent to N−1 (step S708).

In other words, the signature key generation identical equation generation unit 120 judges whether or not the members of each group are shuffled.

When a result of the judgement in step S708 is "NO", the signature key generation identical equation generation unit 120 increments i, moves to step S703, and shuffles the members of the next split key group (step S709). When a result of the judgement in step S708 is "YES", the signature key generation identical equation generation unit 120 finishes the random shuffle processing since the members from all the split key groups have been shuffled.

Figure 8:
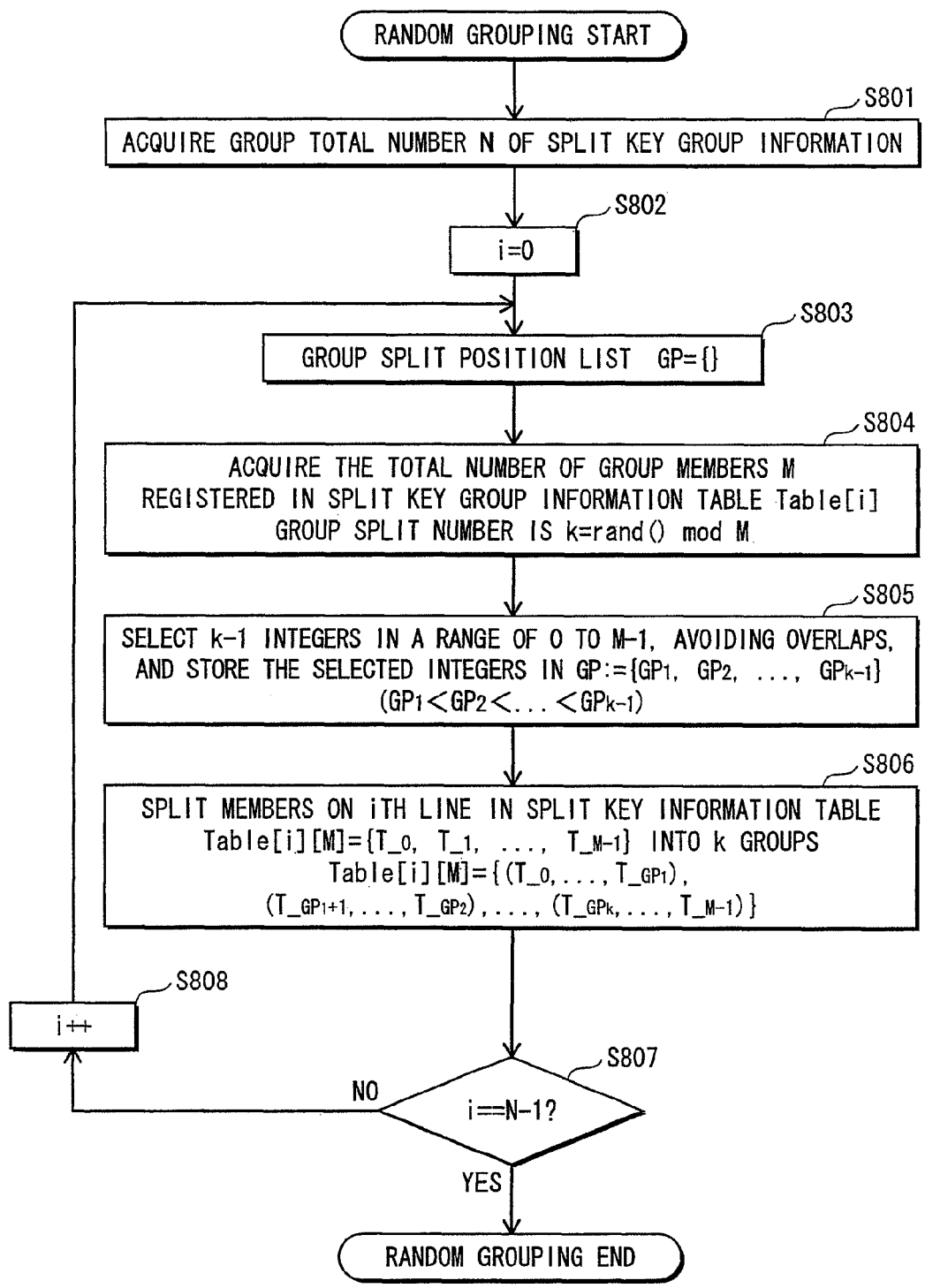
FIG. 8 is a flowchart showing the processing of random grouping using an associative law in the first embodiment of the present invention.

The following is a detailed description of processing of random grouping for the members in the split key groups in step S602, with reference to the flowchart of FIG. 8.

The random grouping is processing to transform, for example, an equation (d1+d2+d3)+d4 into an identical equation d1+(d2+d3+d4) by using the associative law. Here, for example, a relationship in which the calculation result of an equation (1+2)+3 and the calculation result of the equation 1+(2+3) are the same, namely a relationship in which a calculation result does not change no matter how an equation is split for each set of calculations, is described as "the associative law is established".

Note that in FIG. 8, the split key information table 400 is assumed to be expressed as Table[n] [m] in a two-dimensional array table, as stated in the description of FIG. 5.

First, the signature key generation identical equation generation unit 120 acquires the group total number N of the split key information table 400 stored in the split key storage unit 110 (step S801).

Next, the signature key generation identical equation generation unit 120 initializes a variable i to 0 (step S802). Here, the i is a variable that indicates the number of the split key group that is currently targeted for the random grouping.

Next, the signature key generation identical equation generation unit 120 sets a group split position list GP as a null list (step S803). Here, the group split position list GP is a list of values that indicate at which position from the beginning the members from each of the split key groups are to be split.

Then, the signature key generation identical equation generation unit 120 acquires the number of members M registered in Table[i], randomly selects a natural number in a range of 1 to M inclusive, and sets the selected natural number as a group split number k (step S804). Here, the group split number indicates how many groups the split key group is to be split into. When the group split number k is set to be a random natural number, the split number of an equation can be set dynamically, resulting in the signature key generation identical equation being dynamically generated.

Subsequently, the signature key generation identical equation generation unit 120 randomly selects k−1 integers in a range of 0 to M−1 inclusive, in a manner that avoids overlaps. After sorting the selected values in descending order, the signature key generation identical equation generation unit 120 sets the values on the group split position list GP (step S805).

As described above, the split position of an equation is dynamically set by randomly setting the content of the group split position list GP. As a result, the signature key generation identical equation is dynamically generated.

Next, the signature key generation identical equation generation unit 120 splits, behind a member positioned at the group split position list GP selected in step S804, the members in a group within the Table, so that the members of the group are split into k groups (step S806).

Then, the signature key generation identical equation generation unit 120 judges whether or not i and N−1 are equivalent (step S807). In other words, the signature key generation identical equation generation unit 120 judges, for each split key group, whether or not the random grouping has been completed.

When a judgement result in step S807 is "NO", the signature key generation identical equation generation unit 120 increments i and returns to step S803, and thereby further performs the random grouping on the next split key group (step S808). When a judgement result in step S807 is "YES", the signature key generation identical equation generation unit 120 judges that the random grouping has been performed on all of the split key groups, and thus ends the random grouping.

FIG. 9 is a diagram showing a state of the split key information table 400 after the random shuffle processing in FIG. 7 and the random grouping processing in FIG. 8 have been performed on the split key information table FIG. 4.

FIG. 9 shows, as a result of the random shuffling according to the flow of FIG. 7, that the array of Table[0] [2]={AG001, AG002} in MG 001 has been shuffled to be {AG002, AG001}, the array of Table[1] [4]={id001, id002, id003, id004} in AG001 has been shuffled to be {id002, id001, id004, id003}, and the array of Table[2] [4]={id005, id006, id007, id008} in AG002 has been shuffled to be {id007, id006, id008, id005}.

Also, FIG. 9 shows, as a result of the random grouping according to the flow in FIG. 8, that the split key group member identifiers in MG001 are split into 2 groups, namely {AG002} and {AG001}, the split key group member identifiers in AG001 are split into 2 groups, namely {id002, id001} and {id004, id003}, and the split key group member identifiers in AG002 are split into two groups, namely {id005, id006} and {id007, id008}.

After the random shuffling and the random grouping as shown in FIG. 9, the signature key generation equation F21

$$F(d1,d2,d3,d4,d5,d6,d7,d8)=(d1+d2+d3+d4)*(d5+d6+d7+d8)$$

which is shown on the split key information table 400 in FIG. 4 is transformed into a signature key generation identical equation $$G'(d1,d2,d3,d4,d5,d6,d7,d8)=((d7+d6)+(d8+d5))*((d2+d1)+(d4+d3))$$

which is identical to the signature key generation equation F21, with use of the commutative law and the associative law.

Furthermore, the signature key generation identical equation G' is transformed identically using a matrix representation that is described below.

FIG. 10A shows a matrix representation of the right-hand side ((d7+d6)+(d8+d5))*((d2+d1)+(d4+d3)) of the signature key generation identical equation 121 that has been generated in FIG. 9.

Here, the matrix representation is a data structure used to generate an equation G that is identical to a signature key generation equation F, with use of a distributive law, such as (d1+d2)*(d3+d4) being equal to d1*(d3+d4)+d2*(d3+d4). Here, for example, a relationship in which a value of an equation 3*(2+1) is equal to a value of an equation 3*2+3*1, namely a relationship in which a value before developing an equation is equal to a value after the equation has been developed is described as "the distributive law is established".

Here, each element of a matrix 1000 is an equation indicating a multiplication that occurs in case of performing the equation development for each of the groups on which the random grouping has been performed. Also, the elements of the matrix 1000 indicate terms that are to be multiplied when the signature key generation identical equation G' is developed with use of the distributive law.

As a specific example, the following shows the Matrix 1000 when expressed by 2×2 arrays of Matrix[2][2].

Matrix[0][0]=(d7+d6)*(d2+d1)

Matrix[0][1]=(d7+d6)*(d4+d3)

Matrix[1][0]=(d8+d5)*(d2+d1)

Matrix[1][1]=(d8+d5)*(d4+d3)

Here, Matrix[n] [m] is the product of the $n^{th}$ element in the first addition group and the $m^{th}$ element in the next addition group. Each Matrix[n] [m] indicates the product of terms that are to be multiplied when the signature key generation identical equation is developed. It is assumed here that the numbers of indexes n and m begin from zero, and the closer to the left the index number is located in each addition group, the smaller the index number is.

For example, Matrix[0] [0] is a value obtained by multiplying (d7+d6) which is the first member in the first addition group AG 001 in the table shown in FIG. 9, and (d2+d1) which is the first member in the second addition group AG002 in the table. Note that when the number of addition groups increases, the dimension of array of course increases by Matrix[n] [m]"1" . . . .

For each element of the signature key generation identical equation G represented by a matrix as described above, processing that randomly selects parts to be combined is performed in the aforementioned step S603. In other words, in the matrix representations, elements that belong to the same row or column are equations that include at least one term that is common to each other. Therefore, the equations that belong to the same row or column can be combined by using this characteristic.

The following provides a specific example of the processing. First, Matrix[0] [1] and Matrix[1] [1] are assumed to be selected as a combining part as shown in 1001 of FIG. 10A. Here, Matrix[0] [1] and Matrix[1] [1], which have been selected as the combining part, have (d4+d3) as the elements of them. Therefore, Matrix[0][1] and Matrix[1] [1] can be combined by using (d4+d3) as the combining part 1001 as follows.

(d4+d3)*((d7+d6)*(d8+d5))

Here, as described above, a combining part can be dynamically determined by selecting the part randomly. As a result, the signature generation key identical equation G can be dynamically generated.

FIG. 10B illustrates, with use of modifications of general equations, equation transformation for generating the final signature generation identical equation G121 by using the matrix representation.

The signature key generation identical equation G' that has been generated in FIG. 9 is shown as follows:

G'=((d7+d6)+(d8+d5))*((d2+d1)+(d4+d3))    (Equation 1)

and when the above equation is developed by using the distributive law, it can be expressed as follows (Equation 2).

G'=(d7+d6)*(d2+d1)+(d7+d6)*(d4+d3)+(d8+d5)*(d2+d1)+(d8+d5)*(d4+d3)    (Equation 2)

Furthermore, in (Equation 2), when terms corresponding to the combining part 1001 are combined, (Equation 3) is obtained. Here, the combining part 1001 is randomly specified in step S603 as a combining part in the matrix 1000 shown in FIG. 10A.

G'=(d7+d6)*(d2+d1)+(d8+d5)*(d2+d1)+(d4+d3)*((d7+d6)*(d8+d5))    (Equation 3)

This (Equation 3) is the signature key generation identical equation G121 generated by the process of the steps S601 to S603 in FIG. 6.

The combined split key generation unit 130 (i) generates the combined split keys 141 (CD1, CD2, . . . , CDm) whose values are different from those of the split keys 111, by performing, based on the signature key generation identical equation G121, the combination operation on the split keys stored in the split key storage unit 110, (ii) provides each of the generated combined split keys 141 with combined split key identifiers 1101 that are for identifying the combined split key 141, (iii) generates a combined split key identification information table 600 in which the combined split key identifiers 1101 correspond to the combined split keys 141, as shown in FIG. 11, and writes the combined split key identification information table 600 in the combined split key storage unit 140.

Here, the signature key generation identical equation G121 and the combined split keys 141 (CD1, CD2, . . . , CDm) have a relationship in which a value of the signature key D can be calculated from the combined split keys 141 (CD1, CD2, . . . , CDm) and the signature key generation identical equation 121.

Also, the combination operation is an operation for generating a new value by combining a plurality of values. Specifically, such operations include addition, multiplication, and the combination of addition and multiplication. In other words, in the operation of 1+2=3, "3" is a value obtained by performing the combination operation "+" with respect to the values "1" and "2".

Specifically, as described above, the elements {id002, id001}, {id004, id003}, {id005, id006}, and {id007, id008} of the addition groups on which the random grouping has been performed are assumed to be a group of input arguments.

When the combined split keys 141 are generated in a minimum unit of brackets shown by (Equation 3) of the signature key generation identical equation G', the following seven combined split keys 141 are generated.

The variable cd1 stores a result value obtained by calculating d7+d6. The variable cd2 stores a result value obtained by calculating d2+d1. The variable cd3 stores a result value obtained by calculating d8+d5. The variable cd4 stores a result value obtained by calculating d2+d1. The variable cd5 stores a result value obtained by calculating d4+d3. The variable cd6 stores a result value obtained by calculating d7+d6. The variable cd7 stores a result value obtained by calculating d8+d5. In other words, the following equation is established.

G'(d1,d2,d3,d4,d5,d6,d7,d8)=G(cd1,cd2,cd3,cd4,cd5,cd6,cd7)

Here, the split key D1 having the split key identifier ID 001 that corresponds to id001 is assigned to the variable d1 that is an argument of G' (d1,d2,d3,d4,d5,d6,d7,d8). In the same manner, the split key D2 is assigned to the variable d2, and the split keys D3, D4, D5, D6, D7, and D8 are respectively assigned to the variables d3, d4, d5, d6, d7, and d8.

Also, the combined split key D1 is assigned to the variable cd1 that is an argument of G(cd1,cd2,cd3,cd4,cd5,cd6,cd7). In the same manner, the combined split key CD2 is assigned to the variable cd2, and the combined split keys CD3, CD4, CD5, CD6, and CD7 are respectively assigned to the variables cd3, cd4, cd5, cd6, and cd7.

Here, CD1=D7+D6, CD2=D2+D1, CD3=D8+D5, CD4=D2+D1, CD5=D4+D3, CD6=D7+D6, and CD7=D8+D5 are established.

The combined split keys 141 are the result values obtained by calculation. Therefore, deriving the original split key 111 from only this value is difficult. As a result, the split key 111 is concealed.

FIG. 11 shows that the combined split keys 141 (CD1, CD2, CD7) are respectively provided with the combined split key identifiers 1101 (ID001, ID002, ..., ID007).

Therefore, when (Equation 3) that is the signature key generation identical equation G' is assumed to be the signature key generation identical equation G121 that is an equation expressed by the combined split keys 141, (Equation 3) is expressed by the following (Equation 4).

$$G(cd1, cd2, cd3, cd4, cd5, cd6, cd7) = (cd1*cd2) + (cd3*cd4) + cd5*(cd6+cd7) \quad \text{(Equation 4)}$$

Here, a result of assigning the values of the combined split keys (CD1, CD2, ..., CD7) to the arguments cd1, cd2, ..., cd7 of (Equation 4) is equal to a result of assigning (D1, D2, D8) to the arguments d1, d2, ..., d8 of (Equation 3). Furthermore, the combined split keys 141 (CD1, CD2, ..., CD7) are the results of performing the combination operation on the split keys 111 (D1, D2, ..., D8), which means that (Equation 4) is an equation obtains the same result as the signature key generation equation F21. Therefore, the signature generation unit 150 uses (Equation 4) as the signature key generation identical equation 121.

The combined split key storage unit 140 stores the combined split key 141 that is dynamically generated by the combined split key generation unit 130 when signatures are generated.

Upon receiving the message M10, the signature generation unit 150 generates the signature S30 with use of the combined split key 141 stored in the combined split key storage unit 140. In RSA signature generation for example, only the combined split key 141, and not the signature key D20, is used to generate the signature S30 that has the same operation result as S=M^d mod n.

Figure 12:
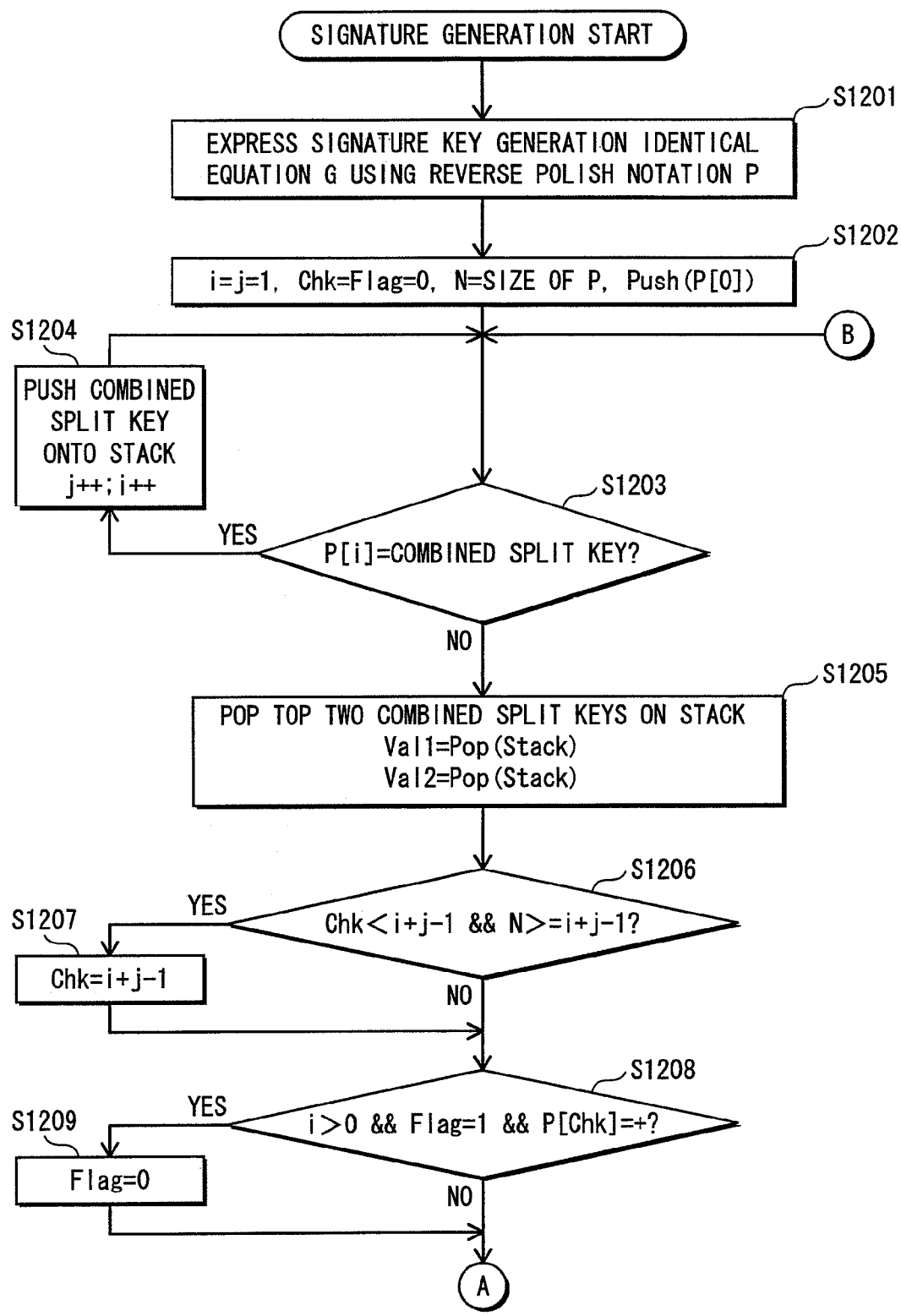
FIG. 12 is a flowchart showing signature generation processing in detail in the first embodiment of the present invention.
Figure 13:
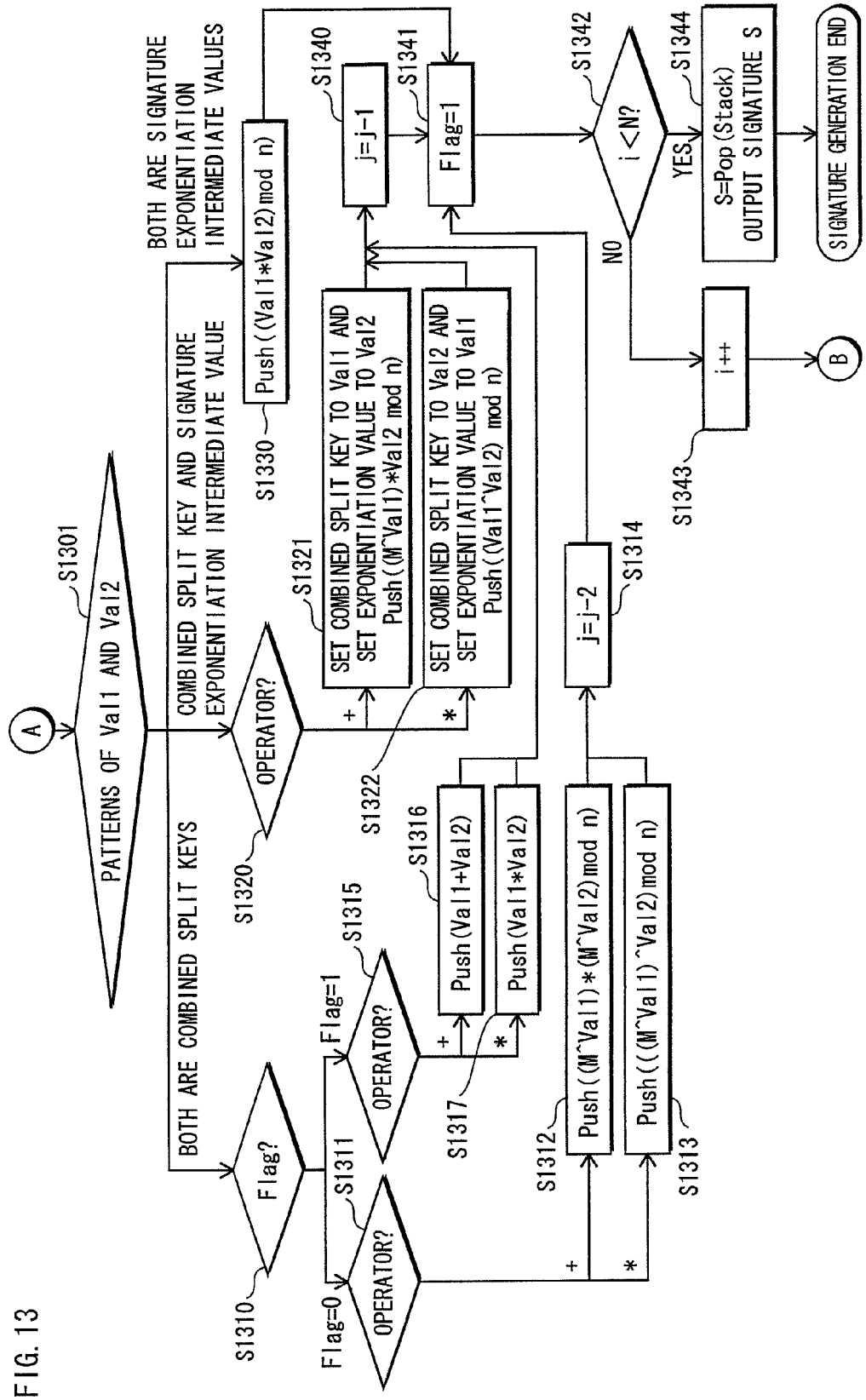
FIG. 13 is a diagram showing the continuation of the flowchart shown in FIG. 12 in the first embodiment of the present invention.

The following describes a processing flow of signature generation performed by the signature generation unit 150 with use of the combined split key 141 and the signature key generation identical equation G121 (Equation 4), with reference to FIGS. 12 and 13.

Described first is the outline of a generation method of the signature S.

An arithmetic expression used for signature generation is determined by the structure of the signature key generation identical equation G121.

For example, when CD1-CD7 are assigned to the arguments cd1-cd7 of the signature key generation identical equation G, the signature key generation identical equation G is (CD1\*CD2)+(CD3\*CD4)+CD5\*(CD6+CD7). In this case, the signature S that is generated by performing the calculation $$S0 = (M^{CD1})^{CD2} \bmod n,$$

$$S1 = S0*((M^{CD3})^{CD4}) \bmod n,$$

$$S = S1*(((M^{CD6})*(M^{CD7}))^{CD5}) \bmod n$$

with use of the message M and n (=p\*q) is the same as the signature S that is generated by performing the operation S=M^D mod n.

Specifically, the above equation is split by "+" operators into (CD1\*CD2), (CD3\*CD4), and CD5\*(CD6+CD7). Then, the split parts are used to perform exponentiation on the message M. Finally, results of the exponentiation operations are multiplied to generate the signature S.

The following is a detailed explanation of the flow. In the following examples, the signature key generation identical equation G121 is again assumed to be (Equation 4). Also, the signature generation unit 150 is assumed to generate signatures with use of an expression in which (Equation 4) is expressed by using Reverse Polish Notation. Here, Reverse Polish Notation is a mathematical notation wherein operators follow targeted operations, and the operations are performed in a manner that every time an operator appears, the operator is applied to the value two places before the operator and the value one place before the operator.

For example, the following shows an array P obtained by expressing (Equation 4) using Reverse Polish Notation and putting in an array.

P[13]={CD1, CD2, \*, CD3, CD4, \*, +, CD5, CD6, CD7, +, \*, +}

The following describes a signature generation flow in detail, with reference to FIG. 12 and FIG. 13.

First, the signature generation unit 150 expresses the signature key generation identical equation G by using Reverse Polish Notation as described above, and then further expresses it as the array P (step S1201).

After setting i and j to 1 respectively, Chk and Flag to 0 respectively, and N to the size of the array P, the signature generation unit 150 pushes P[0] on a stack (step S1202). Here, i indicates the index of an array that is currently being focused on, and j indicates the number of combined split keys that are accumulated on the stack. Also, Chk indicates whether or not a check, which is for verifying which index is the last operator "+" in the array, has been performed. Here, Chk is used when judging, with use of the aforementioned j, whether or not the operator j−1 places ahead of the array [i] that is currently being accessed is "+" and within the valid interval of "+" operator. Also, Flag is used as a flag indicating whether or not the operator j−1 places ahead of the array [i] that is currently being accessed is within the valid interval of "+" operator. To be more specific, Chk is used to judge the breakpoint of the signature key generation identical equation G.

Next, the signature generation unit 150 judges whether or not P[i] is the combined split key (step S1203).

When a result of the judgement of step S1203 is "YES", namely when P[i] is the combined split key, the value of P[i] is pushed on the stack, and i is incremented by one so that the access in the array P is shifted by 1. Also, the signature generation unit 150 increments j due to the increase in the number of combined keys that are pushed on the stack (step S1204).

When a result of the judgement of step S1203 is "NO", namely when P[i] is an operator, the signature generation unit 150 pops the top two combined keys from the stack, which are respectively referred to as Val1 and Val2 (step S1205).

Subsequently, the signature generation unit 150 judges whether i+j−1 is larger than a value of Chk, and equal to or smaller than N (step S1206).

When a result of the judgement of step S1206 is "YES", the signature generation unit 150 sets Chk to the value of i+j−1. In other words, the signature generation unit 150 updates the value of Chk since the judgement to determine whether the operators in the array P are all "+" up to i+j−1$^{th}$ operator is completed. When a result of the judgement of step S1206 is "NO", the processing moves to step S1208. Note that whether i+j−1 is equal to or smaller than N is judged in step S1206 to prevent Chk from indicating a part that is larger than the size of the array.

Then, the signature generation unit 150 judges whether j>0, Flag=1, and P[Chk] is "+" operator (step S1208).

When a result of the judgement of step S1208 is "YES", the signature generation unit 150 sets Flag to 0 (step S1209).

When a result of the judgement of step S1208 is "NO", the processing moves to the processing "A".

The following describes the continuation of the flow shown in FIG. 12, with reference to FIG. 13.

First, the signature generation unit 150 judges the patterns of Val1 and Val2 (step S1301).

When Val1 and Val2 are judged to be the combined split keys as a result the judgement of step S1301, the processing moves to step S1310.

When one of Val1 and Val2 is judged to be the combined split key and the other to be a signature exponentiation intermediate value, the processing moves to step S1320. Here, the signature exponentiation intermediate value is a value obtained by the message M10 being exponentiated with use of a plurality of combined split keys, which is to be an intermediate value in a process of calculating the signature S30. Specifically, such signature exponentiation intermediate values include the below-mentioned S0 and S1.

When Val1 and Val2 are both judged to be the signature exponentiation intermediate values as a result the judgement of step S1301, the processing moves to step S1330.

The following describes the processing of each of steps S1310, S1320, and S1330 onward, which branch from the processing of step S1301 after step S1301 has been completed.

Provided below is a description of a case where the processing moves to step S1310.

First, the signature generation unit 150 judges the Flag (step S1310).

When Flag=0 as a result of the judgement of step S1310, namely the operator j−1 is within the valid interval of "+" operator, the processing moves to step S1311.

Next, the signature generation unit 150 judges the operator of P[i] (step S1311).

When P[i] is the operator "+" as a result of the judgement of step S1311, the processing moves to step S1312.

When P[i] is the operator "*" as a result of the judgement of step S1311, the processing moves to step S1313.

In step S1312, a value of (M^Val)*(M^Val2) mod n is pushed on the stack (step S1312).

In step S1313, the signature generation unit 150 pushes a value obtained by calculating ((M^Val1)^Val2)mod n on the stack (step S1313).

After the processing of steps S1312 and S1313, the signature generation unit 150 sets j to j−2. Then, the processing moves to step S1341 (step S1314). Here, j is set to j−2, because the combined split keys (corresponding to val1 and Val2) are used for a set of calculations, resulting in decrease in the number of combined split keys pushed on the stack. Note that even though the calculation results in steps S1312 and S1313 are pushed on the stack, these values are the aforementioned signature exponentiation intermediate values and not the combined split keys. Therefore, j decreases by 2.

In step S1341, Flag is reset to 1 since the operation performed with respect to this interval (step S1341). In other words, the period in which Flag is set to 0 is from when the "+" operator at the array P[Chk] is judged to be the place for splitting to when the processing of 1312 and S1313 is performed and the value of j is updated. As for the processing other than S1312 and S1313, each step is performed in a state where Flag=1. In other words, the state where Flag=1 continues from when the "+" operator at P[Chk] is judged to be the place for splitting to when the "+" operator at the next P[Chk] is judged to be the place for splitting.

When Flag=1 as a result of the judgement in step S1310, namely the operator j−1 is not within the valid interval of "+" operator, the processing moves to step S1315.

Next, in step S1315, the signature generation unit 150 judges the operator of P[i] (step S1315).

When P[i] is the "+" operator as a result of the judgement in step S1315, the processing moves to step S1316.

When P[i] is the "*" operator as a result of the judgement in step S1315, the processing moves to step S1317.

In step S1316, the signature generation unit 150 pushes a result obtained by calculating Val1+Val2 on the stack (step S1316).

In step S1317, the signature generation unit 150 pushes a result obtained by calculating Val1*Val2 on the stack (step S1317). Here, the values that are pushed on the stack in steps S1316 and S1317 are also assumed to be the combined split keys. In other words, values that are pushed on the stack as values other than the exponentiation intermediate values are assumed to be the combined split keys.

After steps S1316 and S1317, the processing moves to step S1340. The processing after step S1340 is described below.

This concludes a description of each processing steps after S1310.

The following describes a case where the processing moves to step S1320, namely a case where Val1 and Val 2 are the combined split key and the signature exponentiation intermediate value respectively.

First, the signature generation unit 150 judges the operator of P[i] (step S1320).

When P[i] is "+" operator as a result of the judgement of step S1320, the processing moves to step S1321.

When P[i] is "*" operator as a result of the judgement of step S1311, the processing moves to step S1322.

The following describes the flow in a case where the processing branches to step S1321.

In step S1321, the value of the combined split key is set to Val1, and the exponentiation intermediate value is set to Val2. Then, the value obtained by calculating (M^Val1)*Val2 mod n is pushed on the stack (step S1321).

In step S1322, the value of the combined split key is set to Val2, and the exponentiation intermediate value is set to Val1. Then, the value obtained by calculating Val1^Val2 mod n is pushed on the stack (step S1322).

After steps S1321 and S1322, the processing moves to step S1340 (step S1340). Note that each of the processing steps after step S1340 is described below.

(Each of the Processing Steps after S1330)

The following describes a case where the processing moves to step S1330, namely a case where both Val1 and Val2 are the signature exponentiation intermediate values.

In step S1330, the signature generation unit 150 uses Val1 and Val2 that are the exponentiation intermediate values to calculate Val1*Val2 mod n. Then, the signature generation unit 150 pushes the value obtained by the calculation on the stack, and the processing moves to step S1341 (step S1330).

The above completes the description of the individual processing steps after step S1330.

This concludes the individual flows after S1310, S1320, and S1330.

(Common Processing after Steps S1310, S1320, and S1330)

The following describes the common flow after steps S1310, S1320, and S1330.

After the processing of one of step S1316 and S1317, or after the processing of one of step S1321 and S1322, the signature generation unit 150 decrements j and the processing moves to step S1341. When j is not decremented, the processing directly moves to step S1341 (step S1340). Here, in the case of step S1316 and step S1317, j is decremented since the number of combined keys is decreased by 1, resulting from a value that is assumed to be the combined split key is pushed on the stack, with use of Val1 and Val2 that are the combined split keys. Also, in the case of step S1321 or S1322, j is decremented since the combined split key and the exponentiation intermediate value are used for the generation of a new exponentiation intermediate value, and thus the combined split key used for the generation disappears from the stack.

After step S1314 or S1340, Flag is set to 1, and the processing moves to step S1342 (step S1341).

After the processing of step S1341, the signature generation unit 150 judges whether or not i<N (step S1342).

When a result of the judgement in step S1342 is "NO", the signature generation unit 150 increments i in step S1343 and the processing moves to B, so that the same processing is performed on the next element of the array P.

When a result of the judgement in step S1342 is "YES", the generation of the signature has been completed. Therefore, the signature generation unit 150 sets the value of the stack to the signature S30, and outputs the signature S30 (step S1344) to end the signature generation.

With the above processing, the signature S30 for the message M10 is generated, with use of the signature generation identical equation G' and the combined split keys 141.

The above describes the signature generation flow chart, with reference to FIG. 13. Here, a description is provided of the state of the stack in a case where the flow in FIG. 13 is performed, with use of FIG. 14.

Figure 14:
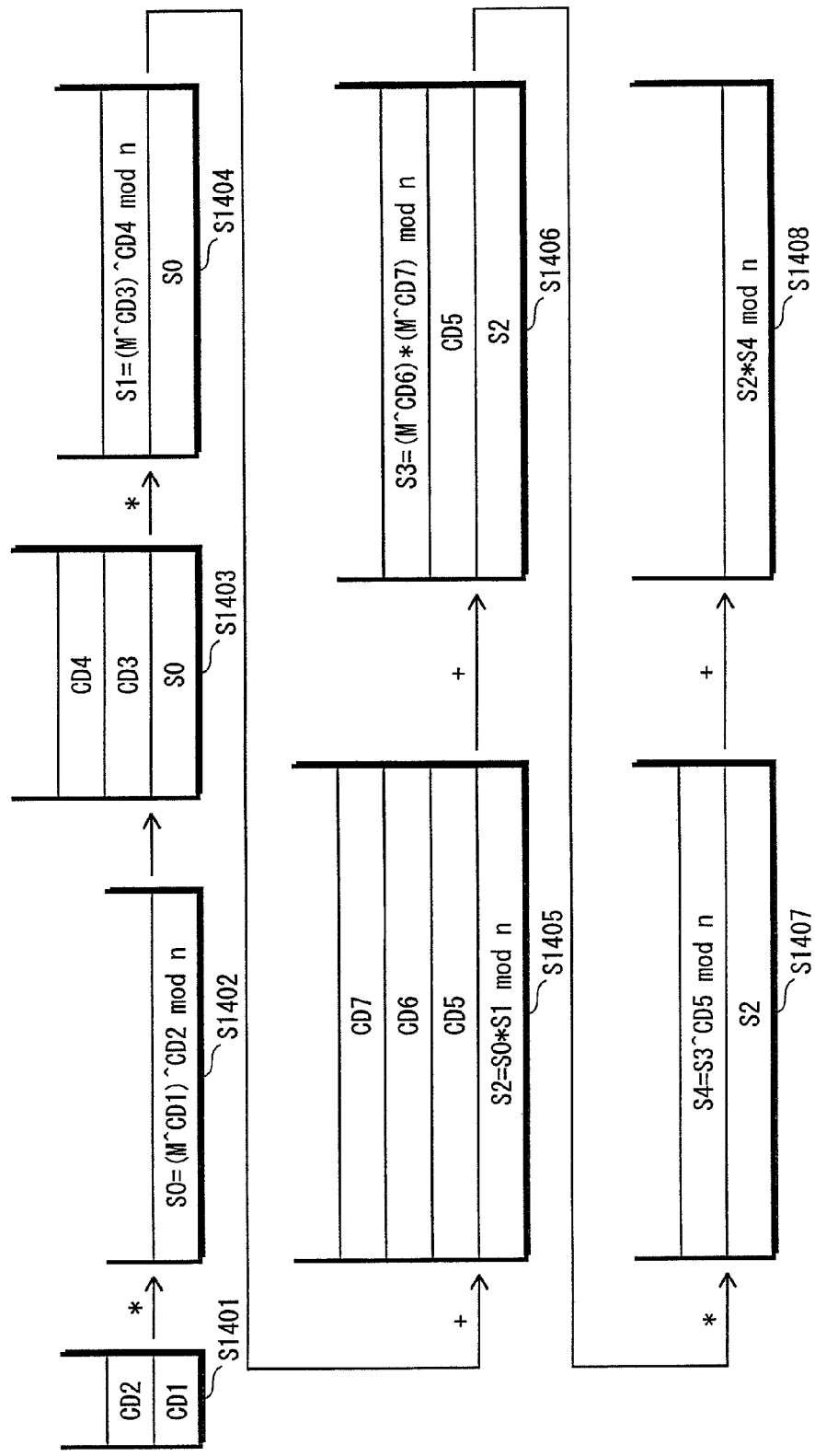
FIG. 14 is a diagram describing a specific example of generating a signature generation equation in the first embodiment of the present invention.

FIG. 14 shows the state of the stack in the signature generation flow described in FIG. 12 and FIG. 13.

The following sequentially describes the signature generation using P, which is the signature generation identical equation G121 expressed in the Reverse Polish Notation.

The signature generation unit 150 pushes the combined split keys CD1 and CD2 on the stack (step S1401). Here, the combined split keys CD1 and CD2 are P[0] and P[1] respectively in P[13]={CD1, CD2, *, CD3, CD4, *, +, CD5, CD6, CD7, +, *, +}. Also, i and j are both 2, and i+j−1 is 3. Therefore, the value of Chk is set to 3.

Then, since P[2] is "*" operator, the signature generation unit 150 pops the top two values from the stack. Also, since Flag=0 and the operator is "*", the signature generation unit 150 sets (M^CD1)^CD2 mod n to S0, and pushes S0 on the stack (step S1402). When this processing ends, i=2, j=0, and Chk=3. Also, the value of Flag is reset to 1 by the operation of step S1341.

Next, the signature generation unit 150 pushes on the stack the combined split keys CD3 and CD4, which are respectively P[3] and P[4] (step S1403). Here, i=4 and j=2, and the value of Chk is updated to 5.

Note that the value of Flag remains unchanged as 1 since P[Chk] is not the operator "+".

Then, the signature generation unit 150 pops the top two values from the stack since P[5] is the operator "*". Also, i=5 and j=2. Therefore, Chk is updated to 6. Here, the operator of P[Chk] is "+", and therefore the value of Flag is updated to 0. Since Flag=0 and the operator of P[5] is "*", the signature generation unit 150 sets S1 to (M^CD3)^CD4 mod n, pushes S1 on the stack, and updates Flag to 1 (step S1404). After this processing, i=5, j=0, Chk=6, and Flag=1.

Next, since P[6] is the operator "+" and Flag=1, the signature generation unit 150 pops S0 and S1, which are the top two values of the stack, sets an operation result of S0*S1 mod n to S2, and pushes S2 on the stack.

Next, the signature generation unit 150 sequentially pushes the combined split keys CD5, CD6, and CD7, which respectively correspond to P[7], P[8], and P[9], on the stack (step S1405).

Next, Flag is set to 0 since P[10] is the operator "+", the value of i at this point is 10, the value of j is 3, Flag=1, and P[12]="+". Subsequently, the signature generation unit 150 pops CD6 and CD7, which are the top two values of the stack. Also, since Flag=0 and the operator is "+", the signature generation unit 150 pushes sets a value obtained by calculating (M^CD6)*(M^CD7) mod n to S3, and pushes the S3 on the stack (step S1406).

Next, the signature generation unit 150 pops S3 and CD5, which are the top two values pushed on the stack since P[11] is the operator "*". At this point, S3 is the signature exponentiation intermediate value, CD5 is the combined split key, and the operator is "*". Therefore, the signature generation unit 150 pushes on the stack S4 that is a value obtained by calculating S3^CD5 mod n (step S1407).

Then, the signature generation unit 150 pops S2 and S4, which are the top two values pushed on the stack since P[12] is the operator "+". At this point, both S2 and S4 are the signature exponentiation intermediate values. Therefore, the signature generation unit 150 calculates S2*S4 mod n, and pushes the calculation result on the stack (step S1408).

With the above processing, the signature generation unit 150 sets a result obtained by calculating S2*S4 mod n to the signature S30, and outputs the signature S30 to complete the signature generation processing.

As described above, the present embodiment makes it possible to generate the signature S30 without using the value of the signature key D21. Furthermore, the combined split keys 141 are generated dynamically, and therefore the signatures can be generated with use of different combined split keys each time. The present embodiment also makes it possible to generate the signatures without using the signature key D or the value of the confidential information (p, q) in RSA signature. Also, the signature generation identical equation G is different every time the signature generation processing is performed. Therefore, it is difficult to specify the combined split key that is used for the calculation to determine the signature key d, even though the difference between the collected results of run-time data is checked. Furthermore, even if the combined split key were to be specified, in order to acquire the signature key D from the combined split key, the signature key generation equation G needs to be specified. This means that all the patterns that the signature key generation identical equation G may take must be analyzed, and that makes the analysis of the signature key D considerably difficult. Furthermore, the signature generation flow is different each time, and therefore (i) the electric power at the time of the signature generation and (ii) the processing time of the signature generation also vary. As a result, the present embodiment has an advantageous effect of being safe against attacks using the power difference and timing attacks.

Note that in the first embodiment, the combined split keys 141 are generated using random shuffling and random grouping, and the signature key generation identical equation G is generated using the matrix representation. However, it is not limited to such. Other methods other than the method described in the present embodiment are acceptable as long as the signature key generation identical equation G is generated from the signature key generation equation F21, with use of the commutative law, associative law, and distributive law.

Note that in the first embodiment, the combined split keys are generated by performing the combination operation on the split keys that is already stored in the split key storage unit. However, the combined split keys generated in the combined split key generation unit may be values that are obtained by performing the combination operation on the combined split keys. In this way, the variations of a value that the combined split key may take increase, resulting in making it difficult to specify the signature key D.

Note that in the first embodiment, the combined split keys are generated by performing the combination operation on the split keys that are already stored in the split key storage unit. However, any generation method is acceptable as long as a result of the generation method is the same as the signature S, which is a result of the signature generation using the signature key D. For example, the signature may be generated by using a redundant key that does not affect the processing that achieves the same result as the signature S. Also, the redundant key may be a value obtained by generating random numbers. In a case of using the redundant key including the random numbers, an equation generated by using the signature key generation identical equation may include the value obtained by generating random numbers. As described above, using the redundant key and utilizing information that is not required for the original processing makes analysis by a fraudulent analyst even more difficult.

Second Embodiment

The following describes the second embodiment of the present invention. The first embodiment provides the example of RSA signature generation. The second embodiment, however, provides an example that applies ECDSA (Elliptic Curve Digital Signature Algorithm). ECDSA is a signature method that is devised based on the elliptic curve discrete logarithm problem. A detailed description of ECDSA is omitted since ECDSA is a well-known technique. The following describes an embodiment in a case where the present invention is applied to ECDSA. Note that in the description of FIG. 15 below, the normal generation flow of an ECDSA signature is the flow that excludes the processing of calculating so as not to cause the confidential information to appear in the memory by using split random number information, combined random number information and such.

Figure 15:
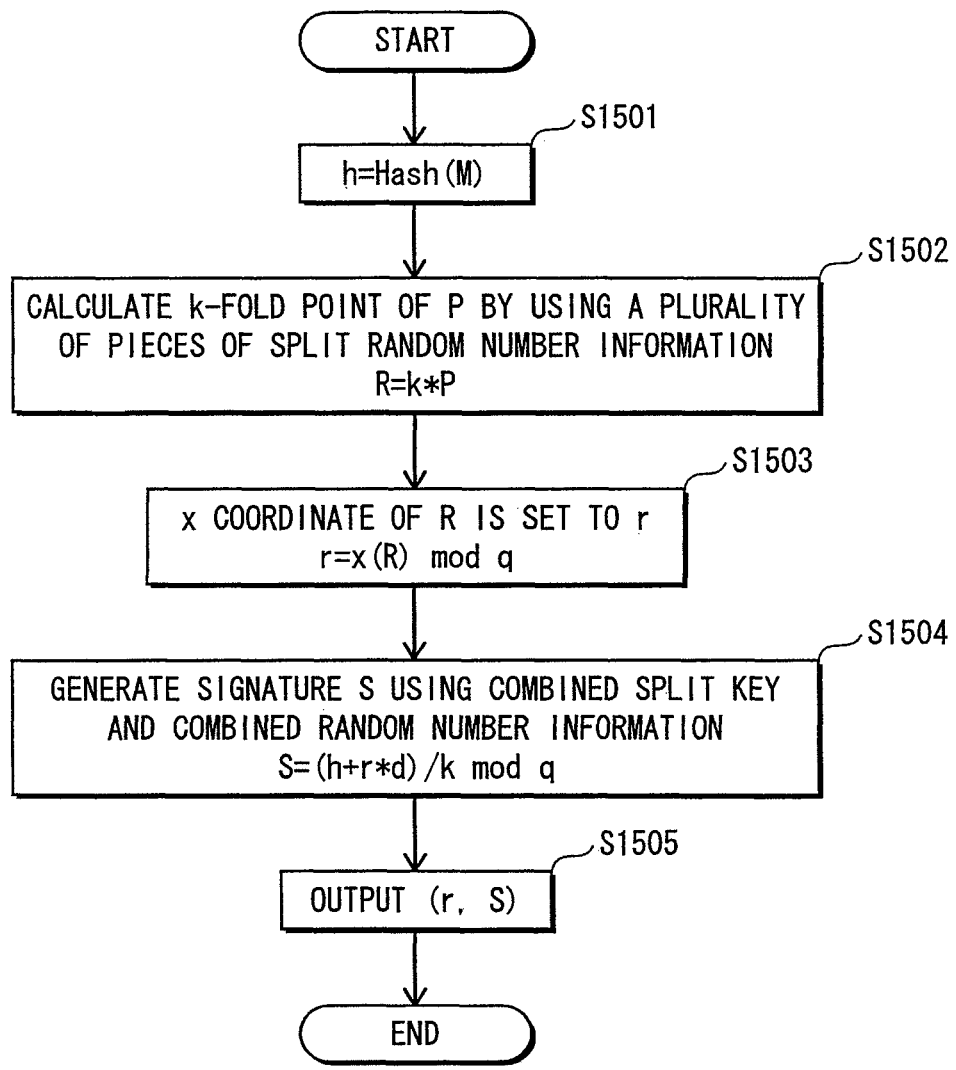
FIG. 15 is a flowchart of ECDSA in a second embodiment of the present invention.

FIG. 15 shows a general flow of ECDSA in the case of applying the present invention.

Note that (i) the structure of the signature generation device 100 and (ii) the generation methods of the signature key generation identical equation G121 and the combined split key 141 in the case of applying the present invention are the same as the first embodiment and thus the description thereof is omitted.

In the second embodiment, descriptions are provided for the parts that are different from the first embodiment when ECDSA is applied.

The signature generation equation based on ECDSA is expressed as follows:

$S=(h+r*d)/k \bmod q$

Here, S represents the signature, d represents the signature key, r represents the x coordinate of a k scalar multiplication point of a base point P, and q is an order of the base point P.

Also, h is a hash value of M and expressed as h=Hash (M), M represents a signature generation target message M, and Hash (M) indicates the calculation to obtain the hash value of the signature generation target message M.

The information that needs to be confidential in ECDSA includes a random number k that is used in step S1502 and the value of the signature key d that is used in step S1504. Here, the reason why the random number k needs to be confidential is that the signature key d can be calculated using the following equation when the signature generation target message M and the signature (r, S) are known.

$h=\mathrm{Hash}(M)$ $d=(k*S-h)/r \bmod q$

The following describes the signature generation flow of ECDSA when the signature generation key d and the random number k are confidential, with reference to FIG. 15. Note that the signature generation device 100 stores the system parameter of the elliptic curve ($y^2=x^3+a*x+b$, a field of definition GF(p), the base point P, the order q of the base point P), and includes a random number generation unit that generates random numbers, even though FIG. 1 does not show the parameter and the random number generation unit in the signature generation device 100 in FIG. 1.

First, the signature generation device 100 calculates the hash value Hash(M) of the signature generation target message M, and sets the hash value to h (step S1501).

Then, the signature generation device 100 generates the random number k for the base point P of the elliptic curve, calculates the k scalar multiplication point of a base point P, and sets the k scalar multiplication point to R (step S1502). Here, the random number k is the confidential information. Therefore, a plurality of pieces of split random number information are generated so that the value of the random number k does not directly appear in the memory. Then, only the generated pieces of split random number information is used to calculate the k scalar multiplication point of P. The processing of step S1502 is described below in detail with reference to FIG. 16.

Next the value of the x coordinate of R is set to r (step S1503).

Subsequently, the signature generation device 100 generates the signature S by performing an operation identical to the equation S=(h+r*d)/k mod q, which includes the random number k and the signature key d, and by using the random number information and the split keys obtained by splitting the signature key d into pieces in advance (step S1504).

Here, the split random number information and the split keys are stored in the memory. However, the values of the random number k and the signature key d are not stored therein.

A detailed description of the processing of step S1504 is provided below, with reference to FIG. 17.

Finally, the signature generation device 100 outputs, as the signature, the pair (r, S) obtained by performing the steps S1503 and S1504, and completes the signature generation of ECDSA.

Figure 16:
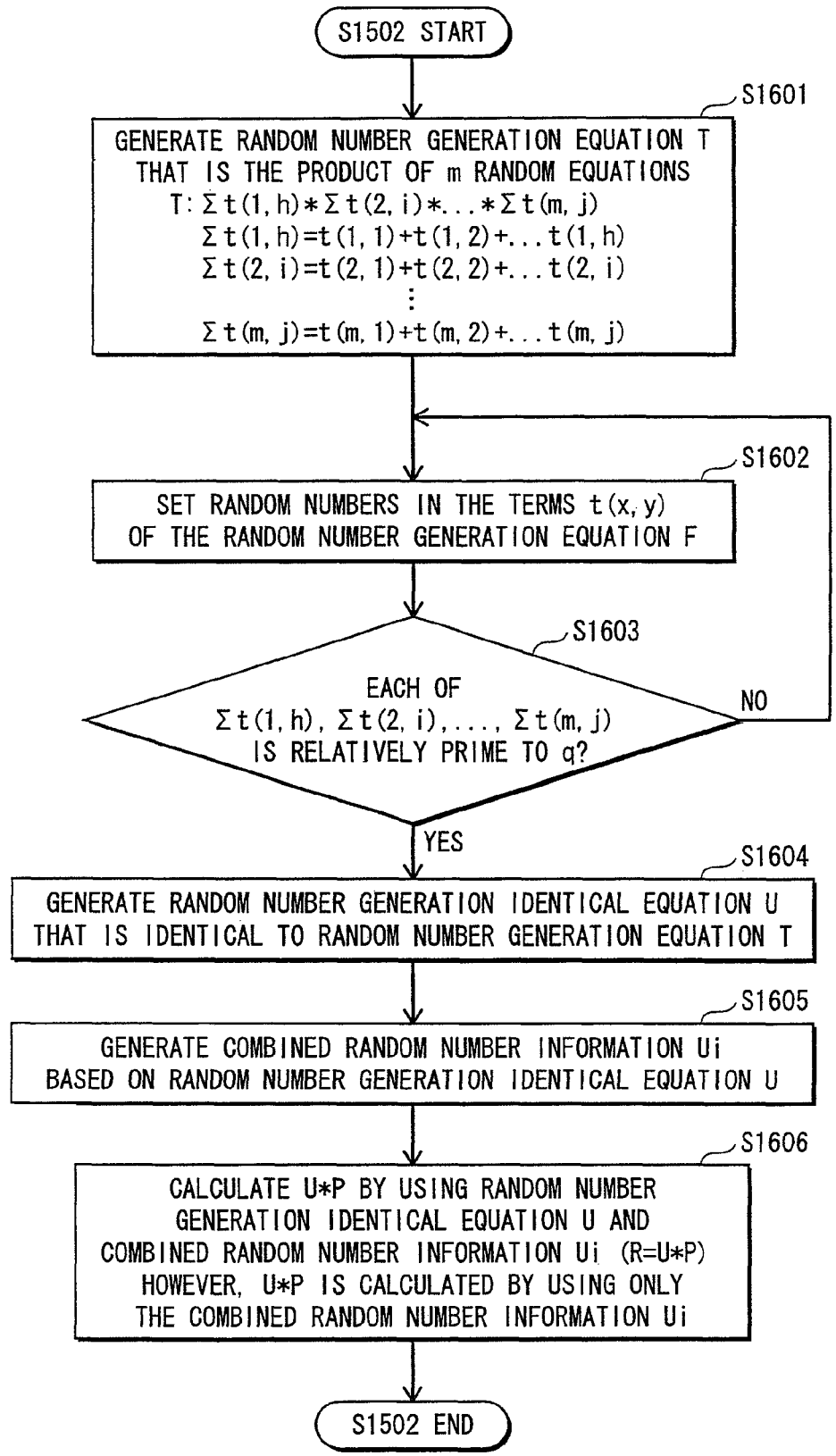
FIG. 16 is a detailed flowchart of S1502 in FIG. 15 in the second embodiment of the present invention.

The following describes step S1502 in detail with reference to the flow chart shown in FIG. 16.

First, the signature generation device 100 generates m random equations R1 . . . Rm, and also generates a random number generation equation T that is for performing the multiplication of the random equations. Here, the product of R1 . . . Rm is the random number k (step S1601).

$T=R1*R2* \ldots Rm$

Furthermore, the signature generation device 100 splits each of the R1 . . . Rm into the sum of the smaller values (split random number information).

$T=\Sigma t(1,h)*\Sigma t(2,i)* \ldots *\Sigma t(m,j)$ (Equation T)

Here, $\Sigma t(1, h) = t(1, 1) + t(1, 2) + \ldots + t(1, h)$ $\Sigma t(2, i) = t(2, 1,) + t(2, 2) + \ldots + t(2, i)$ $\ldots$ $\Sigma t(m, j) = t(m, 1) + t(m, 2) + \ldots + t(m, j)$ t(1,1), t(1,2), . . . , t(1,h) are each the split random number information, and the equation $\Sigma t(1,h)$ represents the sum of h pieces of split random number information.

Also, h, i, j . . . are arbitrary numbers.

Next, the signature generation device 100 generates random numbers and applies each of the random numbers to the respective pieces of the split random number information t(x,y) used for Σt(1,h), Σt(2,i), ..., Σt(m,j), namely that are the terms of the random number generation equation T, namely t(1,1), t(1,2), ..., t(1,h), t(2,1), ..., t(2,i), t(m,1), ..., t(m,j) (step S1602).

Next, the signature generation device 100 judges whether or not each of the values of Σt(1,h), Σt(2,i), ..., Σt(m,j) is relatively prime to q (step S1603).

Here, the expression "relatively prime to q" means a condition necessary for the random k to have an inverse element.

When a result of the judgement of step S1603 is "NO", the signature generation device 100 goes back to the processing of step S1602 and again generates the random numbers and applies them to pieces of the split random number information as described above.

When a result of the judgement of step S1603 is "YES", the signature generation device 100 generates a random number generation identical equation U that is identical to the random number generation equation T (step S1604).

The method of generating the random number generation identical equation U from the random number generation equation T in step S1604 is the same as the method of generating the signature key generation identical equation G121 from the signature key generation equation F21 in the first embodiment. Therefore, a description thereof is omitted.

Next, the signature generation device 100 generates the combined random number information based on the random number generation identical equation U (step S1605). Here, the combined random number information is equivalent to the combined split key in the first embodiment. Therefore, a description of the method of generating the combined random number information in step S1605 is omitted since it is the same as the method of generating the combined split key in the first embodiment.

Next, the signature generation device 100 calculates the U-fold point U*P of the base point P by using the random number generation identical equation U and the combined random number information generated in step S1605, and sets a result of the calculation to R (step S1606).

Here, a result calculated by assigning the value of the combined random number information to the random number generation identical equation U corresponds to the random number k used in the original algorithm of ECDSA. In other words, the U-fold point of P is calculated by using only the combined random number information, which is a value obtained by performing the combination operation on a plurality of split random numbers, without causing a value corresponding to the random number k of step S1502 to directly appear in the memory.

In step S1606, the signature generation device 100 performs the addition of the points on the elliptic curve, and the n-fold multiplication of the point. Here, when the above operations are described by comparing them with the operations in the first embodiment, the "n-fold multiplication" on the elliptic curve corresponds to the "exponentiation operation" in the RSA signature generation processing in the first embodiment, and the addition on the elliptic curve corresponds to the "multiplication" in the RSA signature generation processing in the first embodiment. Therefore, the addition of the points on the elliptic curve and the n-fold multiplication can be performed according to the flow that is made by changing the types of operations applied to the RSA signature generation flow.

Here, for a better understanding of the processing of steps S1601-S1606, a description thereof is provided below with specific examples.

First in step S1601, suppose that the random number generation equation T generated by the above-described method is the equation shown below.

$$T=\Sigma t(1,4)*\Sigma t(2,4) \quad \text{(Equation T)}$$

$$\Sigma t(1,4)=t(1,1)+t(1,2)+t(1,3)+t(1,4)$$

$$\Sigma t(2,4)=t(2,1)+t(2,2)+t(2,3)+t(2,4)$$

Next, each value of the random numbers is respectively set to t(1,1), t(1,2), ..., t(1,4), t(2,1), t(2,2), ..., t(2,4) (step S1602).

At this point, the signature generation device 100 keeps resetting a value of the random number until Σt(1,4) and Σt(2,4) become relatively prime to each other (step S1603).

Then, the random number generation identical equation U is transformed from

Random number generation equation T=(t(1,1)+t(1,2)+t(1,3)+t(1,4))*(t(2,1)+t(2,2)+t(2,3)+t(2,4)) into an identical equation such as $$T=(((t(1,1)+t(1,3))+t((1,2)+t(1,4)))*((t(2,1)+t(2,3))+ \\ (((t(1,1)+t(1,4))+((t(1,2)+t(1,3)))*((t(2,2)+t(2,4))$$

with use of the commutative law, associative law, and the distribution law, and the arguments u1-u6 are set to $$u1=t(1,1)+t(1,3)$$

$$u2=t(1,2)+t(1,4)$$

$$u3=t(2,1)+t(2,3)$$

$$u4=t(1,1)+t(1,4)$$

$$u5=t(1,2)+t(1,3)$$

$$u6=t(2,2)+t(2,4) \text{ (step S1605)}$$

With the above-described step, the random number generation identical equation U becomes $$U(u1,u2,u3,u4,u5,u6)=(u1+u2)*u3+(u4+u5)*u6.$$

The combined random number information U1 is assigned to the argument u1, the combined random number information U2 is assigned to the argument u2, and in the same manner, the combined random number information U3-U6 are respectively assigned to the arguments u3-u6.

$$U=(U1+U2)*U3+(U4+U5)*U6$$

Also, U-fold point U*P of the base point P can be calculated using the equation $$U*P=U3*(U1*P+U2*P)+U6*(U4*P+U5*P).$$

Here, the random number generation equation T is identical to the random number generation identical equation U. Therefore, a result of U*P is the same as a result of T*P. Furthermore, T is a random number generation equation for calculating the random number k, which means that the k scalar multiplication point of P can be calculated without causing (i) the random number k and (ii) the random number generation equation T used for generating the random number k to appear in the memory. Also, the random number generation identical equation U, the corresponding combined random number information and such are randomly generated each time, and thereby making the analysis of a value of the random number k difficult. Consequently, the signature generation device of the second embodiment makes the analysis of the ECDSA signature generation flow difficult.

Figure 17:
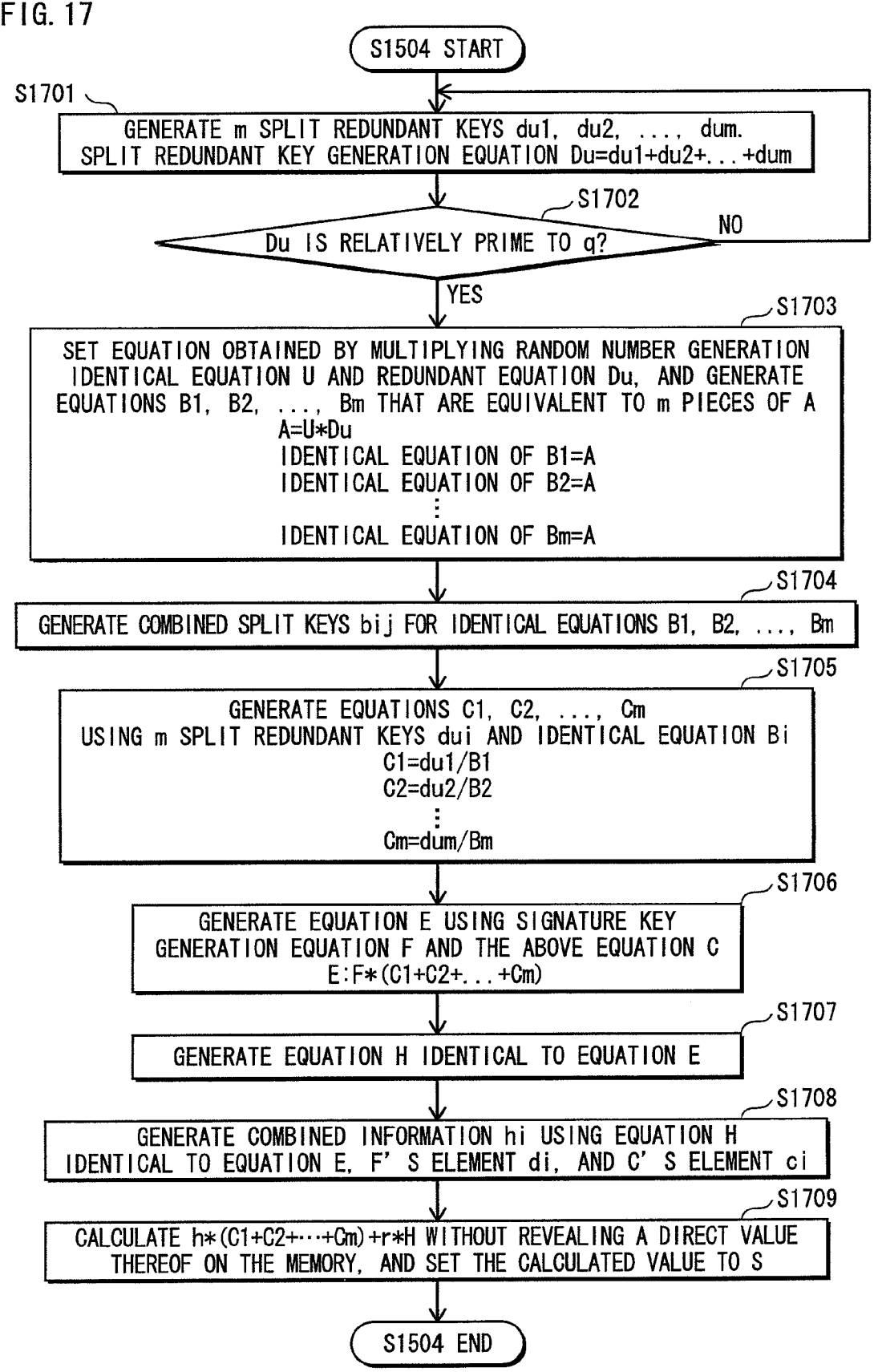
FIG. 17 is a detailed flowchart of S1504 in FIG. 15 in the second embodiment of the present invention.

The following describes the detailed flow of step S1504 in FIG. 15, with reference to FIG. 17.

First, the signature generation device 100 generates m random values, sets each of the random values to du1, du2, ..., dum respectively, and sets du1+du2+ ... +dum obtained by adding split redundant keys to a split redundant key generation equation Du (step S1701).

$$Du = du1 + du2 + \ldots + dum \qquad \text{(Equation Du)}$$

The above equation is used for performing the calculation without causing 1/k in the equation S=(h+r*d)/k mod q to appear in the memory.

In other words, $$1/k = Du/(Du*k)$$
$$= du1/(Du*k) + du2/(Du*k) + \ldots + dum/(Du*k).$$

Also, U generated in step S1502 is equivalent to k. Therefore, $$du1/(Du*U) + du2/(Du*U) + \ldots + dum/(Du*U)$$

may be calculated instead of 1/k.

Furthermore, when the above equation Du*U is set to the equation A, and Du*U is replaced with the equations B1, B2, ..., Bm that are identical to Du*U, $$1/k = (du1/B1) + (du2/B2) + \ldots + (dum/Bm).$$

When the above (du1/B1) is replaced with C1, and in the same manner, (du2/B2) is replaced with C2, ..., and (dum/Bm) is replaced with Cm, $$1/k = C1 + C2 + \ldots Cm.$$

As a result, the signature S is calculated using $$S = (h/k + r*d/k) \bmod n$$
$$= (h*(C1 + C2 + \ldots + Cm) + r*F*(C1 + C2 + \ldots + Cm)) \bmod n$$
$$= (h*(C1 + C2 + \ldots + Cm) + r*H) \bmod n.$$

Here, F in the above equation denotes the following equation shown in the first embodiment:

$$F(d1,d2,d3,d4,d5,d6,d7,d8) = (d1+d2+d3+d4)*(d5+d6+d7+d8).$$

Also, H is an equation identical to F*(C1+C2+ ... +Cm), and F is the aforementioned signature key generation equation.

The following describes the processing after step S1702 shown in the flowchart of FIG. 17.

Next, the signature generation device 100 judges whether or not a value of the split redundant key generation equation Du is relatively prime to q (step S1702).

When a result of the judgement of step S1702 is "NO", the signature generation device 100 goes back to the processing of step S1701 to further generate new du1 ... dum.

When a result of the judgement of step S1702 is "YES", the signature generation device 100 sets the equation U*Du to A, generates m equations identical to A, and sets the generated equations to B1, B2, ..., Bm (step S1703). Here, the equation U*Du is obtained by multiplying (i) the random number generation identical equation U calculated in step S1502 and (ii) the split redundant key generation equation Du.

Then, the signature generation device 100 generates the combined split keys bij (i, j=1, 2, ...) based on the identical equations B1, B2, ..., Bm that are generated in step S1703 (step S1704).

In steps S1703 and S1704, the identical equations B1, B2, ..., Bm, and, the combined split keys bij (i, j=1, 2) corresponding thereto are generated by performing the same processing as the first embodiment while A is assumed to be the signature key generation equation F21 in the first embodiment, and (i) the split redundant keys du1, du2, ..., dum that constitute the equation A and (ii) pieces of the combined random number information U1, U2, ..., Ui that are generated in step S1504 are assumed to be the split keys 111.

Note that only one signature key generation identical equation G121 is generated in the first embodiment, whereas in the second embodiment, m identical equations B1, B2, ..., Bm that each correspond to the signature key generation identical equation G121 are generated, and m combined split keys are generated, so that each of the generated identical equations and combined split keys makes a pair.

Next, the signature generation device 100 generates the following C1, C2, ..., Cm, which are m in number, with use of (i) the m split redundant keys du1, du2, ..., dum, and (ii) the m identical equations B1, B2, ..., Bm, which are both generated in step S1701 (step S1705).

$$C1 = du1/B1$$
$$C2 = du2/B2$$
$$\ldots$$
$$Cm = dum/Bm$$

The above equations can be transformed as follows, with use of the characteristics that (i) C1+C2+ ... +Cm, and, B1, B2, ..., Bm are each identical to A and that (ii) Du=du1+du2+ ... +dum.

$$C1 + C2 + \ldots + Cm = (du1/B1) + (du2/B2) + \ldots + (dum/Bm)$$
$$= ((du1/du2 + \ldots + dum)/A$$
$$= (du1 + du2 + \ldots + dum)/U*Du$$
$$= 1/U$$

U corresponds to the random number k in step S1502. Therefore, a value of 1/U mod q corresponds to a value of k^−1 mod q. Accordingly, the value of k^−1 mod q can be calculated without showing the value of k in the memory.

Also, the identical equations B1 ... Bm, the split redundant keys du1, du2, ..., dum and such are generated randomly. Therefore, the calculation processing of k^−1 mod q can be dynamically changed each time the signature generation is performed. With this structure, the signature generation device of the second embodiment makes the analysis of the ECDSA signature generation flow difficult.

Next, the signature generation device 100 generates (Equation E), with use of the m Ci (i=1, 2, ..., m) equations that are generated in step S1705 and the signature key generation equation F (step S1706).

$$F*(C1+C2+\ldots+Cm) \qquad \text{(Equation E)}$$

Then, the signature generation device 100 generates (Equation H') that is identical to (Equation E) (step S1707).

Subsequently, based on the (Equation H'), the signature generation device 100 performs the combination operation on the split keys that are the elements of the signature key generation equation F, and the element values of C1, C2, ..., Cm, with use of the flow described in the first embodiment, and sets a value obtained by the combination operation to the combination split key (step S1708). Note that a description of the processing of step S1807 and step S1708 is omitted since the processing is the same as the processing in the first embodiment when the signature key generation equation F21 in the first embodiment is assumed to be (Equation E), the element values of C1, . . . , Cm and the element value di of the signature key generation equation F21 are assumed to be the element value di of the signature key generation equation F21 in the first embodiment. With the above-described steps, the identical equation H' can be expressed as H that is generated with use of the combined split key.

As a result, a combined split key hi that corresponds to the identical equation H is randomly generated each time, thereby making the analysis of the ECDSA signature generation flow difficult.

Next, using (i) the hash value h that is calculated in step S1501, (ii) the equations C1, C2, . . . , Cm that are generated in step S1705, (iii) the identical equation H that is generated in step S1707, and (iv) the value r of the x coordinate of the point P that is calculated in step S1503, the signature generation device 100 performs an operation identical to $$S=(h+r*d)/k \bmod q$$

by calculating the following equation $$S=h*(C1+C2+\ldots+Cm)+r*H \bmod q$$

and sets the calculated value to S (step S1709).

With the above-described processing, the signature generation device of the second embodiment generates the signature S without directly revealing a value of the random value k and a value of the signature key d.

Note that in the operation in step S1709, it is preferable to perform an operation in an order that does not allow a value of a calculation result of $h*(C1+C2+\ldots+Cm)$ to directly appear in the memory.

This is because k that is the random number information can be restored from the value of $h*(C1+C2+\ldots+Cm)$.

The order of the operation is described below with specific examples. Therefore, the description thereof is omitted here.

The following describes the flow shown in FIG. 17 with specific examples.

First the signature generation device 100 generates three random numbers, sets each of the random numbers to the split redundant keys du1, du2, and du3 respectively, and to $$Du=du1+du2+du3 \quad \text{(step S1701)}.$$

Here, when Du is not relatively prime to q, the signature generation device continues to generate the split redundant keys until Du and q become relatively prime to each other (step S1702).

The following describes a calculation using the random number generation identical equation U. Here, the random number generation identical equation U is assumed to be the following (Equation U) generated by the processing described in FIG. 16.

$$U=(U1+U2)*U3+(U4+U5)*U6 \quad \text{(Equation U)}$$

The following is one example of (Equation A) when U is (Equation U).

$$((U1+U2)*U3+(U4+U5)*U6)*(du1+du2+du3) \quad \text{(Equation A)}$$

Next, the signature generation unit generates (Equation B1), (Equation B2), and (Equation B3) that are identical to (Equation A).

As for the calculation processing steps of the identical equation B1, the signature generation device 100 first generates an identical equation 1 of the equation A as follows, $$(((U1+U2)*U3)+((U4+U5)*U6))*(du1+du2)+((U1+U2)*U3+(U4+U5)*U6)*du3$$

and sets each of the combined split keys as follows, based on the generated identical equation 1.

$$b11=(U1+U2)*U3$$

$$b12=(U4+U5)*U6$$

$$b13=du1+du2$$

$$b14=(U1+U2)*U3+(U4+U5)*U6$$

$$b15=du3$$

Then, the identical equation B1 becomes the following (Equation B1) with use of the identical equation 1 of the equation A and the above-described combined split keys.

$$(b11+b12)*b13+b14*b15 \quad \text{(Equation B1)}$$

In the same manner as B1, the calculation processing of the identical equation B2 begins by generating an identical equation 2 of the equation A as follows.

$$(U1*U3+U2*U3+U4*U6+U5*U6)*((du1)+(du2+du3))$$

Based on the generated identical equation 2, each of the combined split keys is set as follows.

$$b21=U1*U3$$

$$b22=U2*U3$$

$$b23=U4*U6$$

$$b24=U5*U6$$

$$b25=du1$$

$$b26=du2+du3$$

Then, the identical equation B2 becomes the following (Equation B2) using the identical equation 2 of the equation A and the above-described combined split keys.

$$B2=(b21+b22+b23+b24)*(b25+b26) \quad \text{(Equation B2)}$$

Further, in the same manner as above, the calculation processing of the identical equation B3 begins by generating an identical equation 3 of the equation A as follows:

$$((U1*U3+U4*U6)+(U2*U3+U5*U6))*(du1+du2+du3)$$

Based on the generated identical equation 3, each of the combined split keys is set as follows.

$$b31=U1*U3+U4*U6$$

$$b32=U2*U3+U5*U6$$

$$b33=du1+du2+du3$$

Then, the identical equation B3 becomes the following (Equation B3) using the identical equation 3 of the equation A and the above-described combined split keys.

$$(b31+b32)*b33 \quad \text{(Equation B3)}$$

Subsequently, the signature generation device 100 generates the following three equations C1, C2, and C3, with use of the generated (Equation B1), (Equation B2) and (Equation B3).

$$C1 = du1/B1 = du1/((b11+b12)*b13+b14*b15) \quad \text{(Equation C1)}$$

$$C2 = du2/B2 = du2/((b21+b22+b23+b24)*(b25+b26)) \quad \text{(Equation C2)}$$

$$C3 = du3/B3 = du3/((b31+b32)*b33) \quad \text{(Equation C3)}$$

At this point, $C1+C2+C3 = k^{\wedge}(-1) \bmod q$ is established.

Assume here that the signature key d of ECDSA is split into 8 split keys and the signature key generation equation F is (Equation F) as follows.

$$F = (d1+d2+d3+d4)*(d5+d6+D7+d8) \quad \text{(Equation F)}$$

Here, (Equation E) that is generated in the succeeding step S1706 is $(d1+d2+d3+d4)*(d5+d6+d7+d8)*(C1+C2+C3)$ (step S1706). Then, the signature generation device 100 generates, from (Equation E), (Equation H) that is identical to (Equation E) (step S1707).

Here, an example of identity transformation of (Equation E) is set to $$H = ((d1+d3)+(d2+d4))*((d6+d7)+(d8+d5))*C1+((d2+d3)+(d1+d4))*((d6+d8)+(d7+d5))*(C2+C3)$$

and each of the combined split keys is set to $$H1 = d1+d3$$
$$H2 = d2+d4$$
$$H3 = d6+d7$$
$$H4 = d8+d5$$
$$H5 = C1$$
$$H6 = d2+d3$$
$$H7 = d1+d4$$
$$H8 = d6+d8$$
$$H9 = d7+d5$$
$$H10 = C2+C3$$

In this case, the identical equation H can be expressed by the following (Equation H), with use of the above combined information.

$$((H1+H2)*(H3*H4))*H5+((H6+H7)*(H8*H9))*H10 \quad \text{(Equation H)}$$

Then, by using the commutative law, associative law, and distributive law, the signature generation device 100 calculates $$h*(C1+C2+C3)+r*H = h*(C1+C2+C3)+r*\{((H1+H2)*(H3+H4))*H5+((H6+H7)*(H8*H9))*H10\}$$

in a manner that a value of $h*(C1+C2+C3)$ does not directly appear in the memory, and sets a result of the calculation to the signature S. In order not to show the value of $h*(C1+C2+c3)$ in the memory, the signature generation device 100, for example, performs calculation by transforming the above equation into an equation as follows:

$$h*(C1+C2+C3)+r*\{((H1+H2)*(H3*H4))*H5+((H6+H7)*(H8*H9))*H10\} = h*(C1+C2)+r*\{((H1+H2)*(H3*H4))*H5\}+h*C3+r*\{((H6+H7)*(H8*H9))*H10\}.$$

In other words, in the above calculation formula, the signature generation device 100 splits $h*(C1+C2+C3)$ into $h*(C1+C2)$ and $h*C3$, and places the rest of the calculation between $h*(C1+C2)$ and $h*C3$, so that the value of $h+(C1+C2+C3)$ is not directly shown in the memory.

With the above-described processing steps, (i) the random number generation identical equation U used for generating the signature generation, and (ii) the signature generation equation H can be changed each time the signature generation is performed without revealing, in the memory, a value corresponding to the random number k in step S1502 and the value of the signature key d. Therefore, it has an advantageous effect that specifying the signature key d with use of unauthorized analysis becomes extremely difficult.

Note that the signature generation methods are not limited to RSA signature and ECDSA as described in the first and second embodiments, but may also be public key cryptography using an arithmetic operation such as RSA cryptography, Elliptic curve cryptography, ElGamal cryptography. Also, the processing steps illustrated in the first and the second embodiments are not only applied to the key information used for cryptography and signatures but also to confidential information that is different from the key information but is to be protected.

Third Embodiment

The following describes the third embodiment of the present invention.

Figure 18:
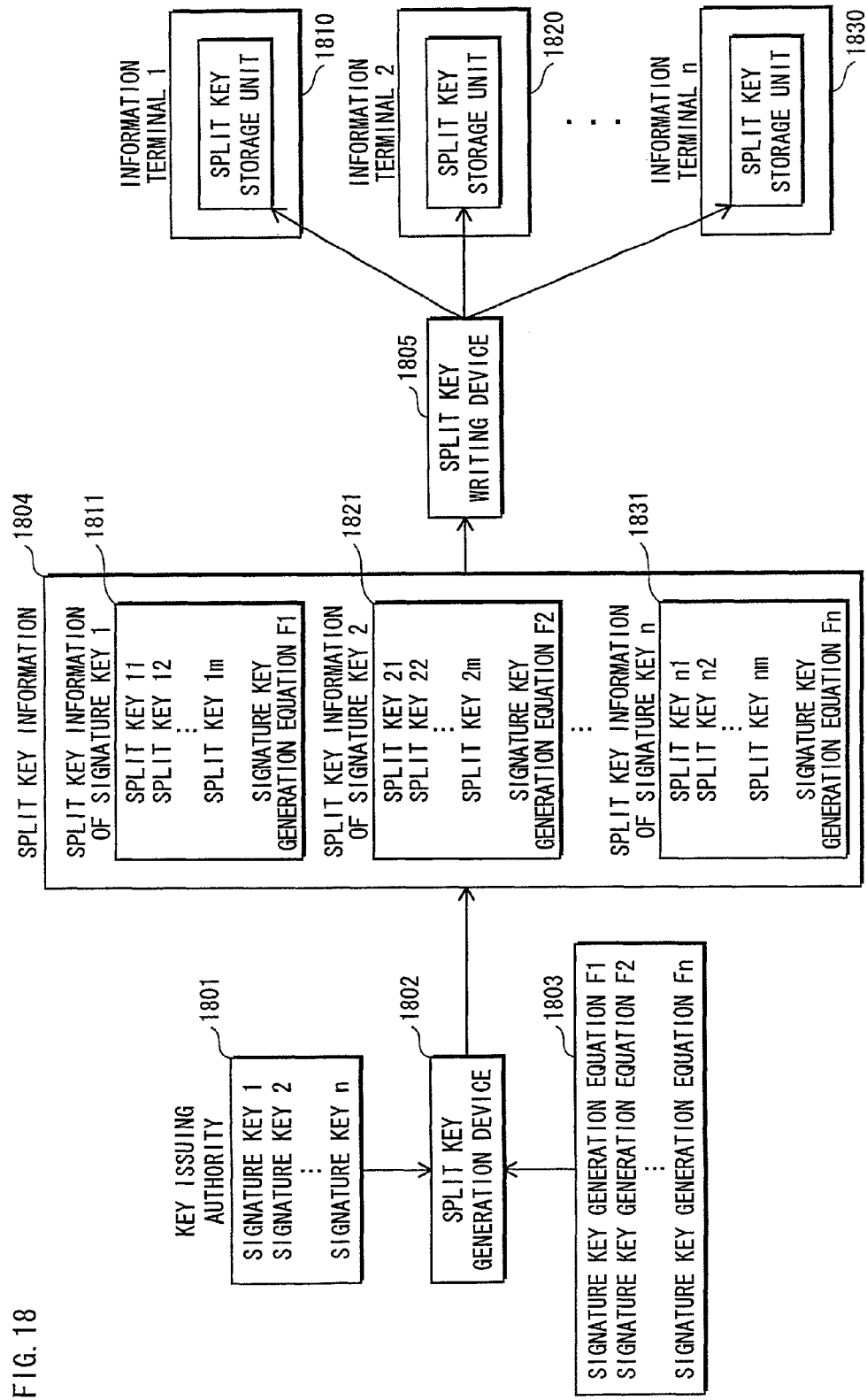
FIG. 18 is a diagram showing split key embedding processing in a third embodiment of the present invention.

In the third embodiment, a description is provided of the processing of splitting the signature key into split keys and embedding the split keys in a terminal device, with reference to FIG. 18.

A key issuing authority issues signature keys for generating signatures.

The key issuing authority issues a signature key 1, signature key 2, . . . , signature key n, for n pieces of terminal devices (an information terminal 1(1810), information terminal 2(1820), . . . , information terminal n(1830))), respectively.

A split key generation device 1802 receives a signature key and a signature key generation equation that are issued by the key issuing authority, splits the signature key based on the signature key generation equation, and outputs the split keys and the signature key generation equation.

A split key writing device 1805 writes, in the information terminal that performs the signature generation, the split keys generated by the split key generation device 1802 and split key information 1804 that includes the signature key generation equations. For example, in a case where the information terminal is an embedded apparatus such as a cellular phone, a ROM writer is used as the split key writing device.

Here, the information terminal 1(1810), information terminal 2(1820), . . . , information terminal n(1830) generate signatures. The structure of these information terminals is the same as the signature generation device 100. Therefore, only the parts necessary for a description of the third embodiment are shown in FIG. 18.

A terminal manufacturer inputs, to the split key generation device 1802, (i) a signature key 1801 that has been issued by the key issuing authority and (ii) a signature key generation equation 1803, and generates the split key information 1804 that includes (i) split keys that are keys obtained by splitting the signature key 1801 and (ii) the signature key generation equation 1803 that is information for generating the signature key from split keys.

The split key information 1804 includes split key information 1811 indicating a signature key 1, split key information 1821 indicating a signature key 2, and split key information 1831 indicating a signature key n. The split key information

1811 indicating the signature key 1 is information for the information terminal 1(1810), the split key information 1821 indicating the signature key 2 is information for the information terminal 2(1820), and the split key information 1831 indicating the signature key n is information for the information terminal n(1830). The split key information (1811, 1821, and 1831) may be the split key identification information table 200 and the split key information table 400 that are described in the first embodiment, or may be other information as long as it is information with which a relationship between the split key and the signature key generation equation F can be identified, so that the same value as the signature key d can be calculated.

Next, the terminal manufacturer writes the split key information 1804 that has been generated by the split key generation device 1802 in each of the split key storage units of the information terminals 1810, 1820, and 1830, with use of the split key writing device 1805.

Specifically, for example, each piece of the split key information (1811, 1821, 1831) generated by the split key generation device may be a data file containing the split key identification information table 200 and the split key information table 400, and the terminal manufacturer may compile the data file to obtain binary data, and writes the binary data in the split key storage units, with use of the split key writing device 1805 such as the ROM writer.

With the above processing, the split key information 1811 indicating the signature key 1 is written in the split key storage unit of the information terminal 1(1810), the split key information 1821 indicating the signature key 2 is written in the split key storage unit of the information terminal 2 (1820), and the split key information 1831 indicating the signature key n is written in the split key storage unit of the information terminal n(1830).

Note that in the third embodiment, the signature key generation equations of the information terminals (1810, 1820, and 1830) are respectively F1, F2, . . . , Fn. However, the same signature key generation may be applied to all of the information apparatuses. In this case in order to cause each of the information terminals perform different processing, the split key generation device 1802 needs to generate different split keys for each of the information terminals, and writes, to each of the information terminals (1810, 1820, 1830), the different the split keys that have been generated.

Note that in the third embodiment, the split key generation device 1802 receives the signature key generation equation 1803 from outside, and splits the signature key based on the signature key that has been received. However, the information to be input is not limited to such, but may be parameter information for generating the split keys from the signature key. For example, it is possible to input, to the split key generation device 1802, a parameter indicating a split number that is the number of pieces the signature key is split into. Then, the split key generation device 1802 may split the signature key according to the split number that has been input. Furthermore, the split key generation device 1802 may also generate the signature key generation equations according to the split number that has been input, and output the signature key generation equations. Here, a parameter to be input for generating the split keys may not be the split number, but may be parameter information indicating a security level or the performance of the CPU. In this case, the split key generation device 1802 may determine the split number according to the parameter that has been input. Specifically, if the security level is low or the performance of the CPU is high, the split key generation device 1802 may generate more split keys. This makes it possible to adjust the split number of the signature key d, resulting in the security level being set flexibly.

Also, the signature key 1801 may be issued in a state of being encrypted by the key issuing authority. In this case, the manufacturer decrypts the signature key 1801 that has been encrypted, and then inputs the decrypted signature key to the split key generation device 1802. Also, if the public key encryption system is used for the encryption system here, the key issuing authority may send the terminal manufacturer the signature key 1801 by providing a signature for the signature key 1801. Then, the terminal manufacturer may verify the validity of the signature key 1801 by verifying the signature of the signature key 1801. This makes it possible to protect the signature key 1801 that is issued from the key issuing authority to the terminal manufacturer from being wiretapped or tampered while the transmission between the key issuing authority and the terminal manufacturer is in progress.

Note that the above describes that the split key generation device 1802 and the split key writing device 1805 are used by the terminal manufacturer. However, in practice, a place in which the split key generation device 1802 is used may be different from a place in which the split key writing device 1805 is used, during the manufacturing process. Specifically, the split key writing device 1805 may be used in a manufacturing factory of the terminal. In this case, the split key information 1804 that has been generated by the split key generation device 1802 may be encrypted and distributed to the manufacturing factory of the terminal. Then, in the manufacturing factory of the terminal, the encrypted split key information that has been distributed may be decrypted to obtain the split key information 1804, which is then input to the split key writing device 1805. This makes it possible to distribute the split keys safely.

Note that the above description does not provide the encryption method of the signature key 1801 and the split key information 1804. However, the encryption method used in this case is not limited to a particular encryption method, and may be realized by using private key encryption such as AES, or public key encryption such as RSA or elliptic curve encryption.

Fourth Embodiment

Figure 19:
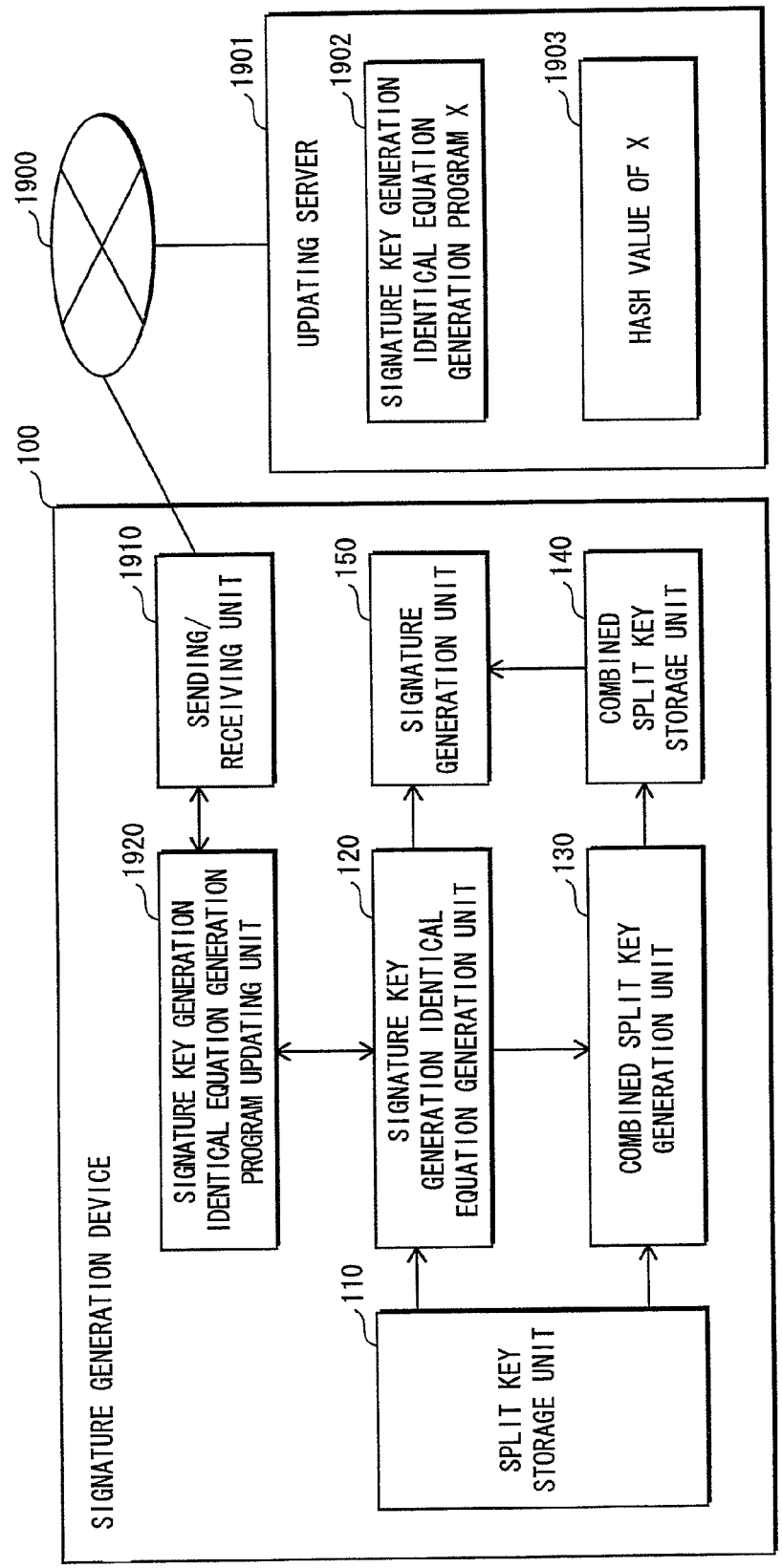
FIG. 19 is a diagram showing an outline of the program update of a signature key generation identical equation generation unit 120 in a fourth embodiment of the present invention.

In the fourth embodiment, the description is provided of a method for updating, via a network, a signature key generation identical equation generation program that is for the signature key generation identical equation generation unit 120 to calculate the signature key generation identical equation, with reference to FIGS. 19 and 20.

FIG. 19 is a schematic diagram showing that the signature generation device 100 downloads a signature key generation identical equation generation program X1902 for updating, from an updating server 1901 on a network, and updates the signature key generation identical equation generation program of the signature key generation identical equation generation unit 120. The fourth embodiment is different from the first embodiment in that the fourth embodiment downloads a new signature key generation identical equation generation program from an updating server on a network, and updates the signature key generation identical equation generation program of the signature key generation identical equation generation unit 120 to the signature key generation identical equation generation program X1902 that has been downloaded.

Here, the signature generation device 100 and the updating server 1901 are connected to each other via a network 1900 such as the Internet.

The updating server 1901 stores the signature key generation identical equation generation program X1902 that is different from the signature key generation identical equation generation program of the signature key generation identical equation generation unit 120 in the signature generation device 100. Here, the signature key generation identical equation generation program X1902 has a function equivalent to the signature generation program, namely a function to generate the signature key generation identical equation G121 that is identical to the signature key generation equation F21. However, a flow in which the signature key generation identical equation generation generates the signature key generation identical equation G121 is assumed to be different from a flow in which the signature key generation identical equation generation program of the signature key generation identical equation generation unit 120 generates the signature key generation identical equation.

The updating server 1901 also stores a tampering detection value 1903 of the signature key generation identical equation generation program X that is used for verifying the validity of the signature key generation identical equation generation program X1902 that is a program for updating. Note that the specific examples of the tampering detection value 1903 include the hash value of the signature key generation identical equation generation program X.

In the fourth embodiment, the signature generation device 100 is assumed to have a sending/receiving unit 1910 and a signature key generation identical equation generation program updating unit 1920, in addition to the components described in the first embodiment with reference to FIG. 1.

The sending/receiving unit 1910 sends and receives data to/from the updating server 1901 via the network.

The signature key generation identical equation generation program updating unit 1920 sends an updating request message of the signature key generation identical equation generation program to the updating server 1901 that exists on the network, with use of the sending/receiving unit 1910. Upon receiving the signature key generation identical equation generation program X1902 from the updating server 1901 with use of the sending/receiving unit 1910, the signature key generation identical equation generation program updating unit 1920 updates the program of the signature key generation identical equation generation unit 120 to the signature key generation identical equation generation program X1902 that has been received.

The following describes the updating flow of the signature key generation identical equation generation program of the signature key generation identical equation generation unit 120, with reference to FIG. 20.

First, the signature key generation identical equation generation program updating unit 1920 requests the sending/receiving unit 1910 to download the signature key generation identical equation generation program X1902 (step S2001).

Upon receiving the request for downloading, the sending/receiving unit 1910 sends, to the updating server 1901, the download request message of the signature key generation identical equation generation program X1902 via the network 1900 (step S2002).

Upon receiving the download request message, the updating server 1901 sends, to the sending/receiving unit 1910, the signature key generation identical equation generation program X1902 and the hash value 1903 of the signature key generation identical equation generation program X1902 that are stored in the updating server 1901 (step S2003).

When having completed receiving, from the updating server 1901, the signature key generation identical equation generation program X1902 and the hash value 1903 of the signature key generation identical equation generation program X1902, the sending/receiving unit 1910 notifies the signature key generation identical equation generation program updating unit 1920 that the downloading has been completed (step S2004).

Then, the signature key generation identical equation generation program updating unit 1920 judges whether or not the signature key generation identical equation generation program X1902 has been tampered, with use of the hash value 1903 of the signature key generation identical equation generation program X1902. When a result of the judgement is "YES", namely the signature key generation identical equation generation program X1902 is judged to be tampered, the signature key generation identical equation generation program updating unit 1920 finishes the updating flow. When a result of the judgement is "NO", namely the signature key generation identical equation generation program X1902 is judged to be not tampered, the signature key generation identical equation generation program updating unit 1920 continues the updating processing (step S2005).

Then, the signature key generation identical equation generation program updating unit 1920 updates the signature key generation identical equation generation program of the signature key generation identical equation generation unit 120 by overwriting the signature key generation identical equation generation program with the signature key generation identical equation generation program X1902 that has been downloaded (step S2006).

When the overwriting has been completed, the signature key generation identical equation generation program updating unit 1920 receives a notification indicating that the overwriting has been completed, thereby ending the updating processing (step S2007).

As described above, the signature generation device 100 downloads, from the updating server 1901, the signature key generation identical equation generation program X1902 that is a new signature key generation identical equation generation program, with use of the network 1900, and updates the signature key generation identical equation generation program of the signature key generation identical equation generation unit 120.

With this updating function, the signature generation device 100 ensures the security by updating the signature key generation identical equation generation program if the signature key generation identical equation generation program has been tampered by an unauthorized analyst, or a malfunction in the signature key generation identical equation generation program is detected.

Note that the fourth embodiment does not include a description of the timing of sending the download request of step S2001 in FIG. 20. However, the signature generation device 100 may verify the validity of the program of the signature key generation identical equation generation unit 120 (the program is equivalent to the signature key generation identical equation generation program X) before sending the request for starting the signature generation processing. Then, the download request of step S2001 may be sent if a result of the verification is "Not valid". Specific methods for verifying the validity of the program of the signature key generation identical equation generation unit 120 include a method that compares two hash values. One of the two is the hash value of the program of the signature key generation identical equation generation unit 120 that is stored in the secure memory of the signature generation device 100. The other one of the two is the hash value of the program of the signature key generation identical equation generation unit 120 that is calculated before the signature generation processing.

Also, in the fourth embodiment, data communication between the signature generation device 100 and the updating server 1901 may be the sending and receiving of data that has been encrypted by a session key. Here, the session key is shared between the signature generation device 100 and the updating server 1901 by using a secure authenticated channel (SAC). SAC is a known technique used in Secure Sockets Layer (SSL), and therefore a description thereof is omitted.

Also, in the fourth embodiment, the signature generation device 100 downloads the signature key generation identical equation generation program X1902 for updating from the updating server 1901 via the network. However, the program of the signature key generation identical equation generation program X1902 may be stored in a portable medium such as a DVD or a CD, so that instead of the network, the portable medium may be used to update the program of the signature key generation identical equation generation unit 120. The signature generation device 100 that performs this processing is realized when the sending/receiving unit 1910 shown in FIG. 20 has a function as a driver that controls the reading and writing of data with the portable medium. In other words, in FIG. 20, the above-described signature generation device 100 is realized by the sending/receiving unit 1910 being a recording medium driver, the updating server 1901 being a recording medium, and replacing the download request with a read request from the recording medium. Therefore, a detailed description thereof is omitted.

Also, in the fourth embodiment, the program of the signature key generation identical equation generation unit 120 is updated. However, instead of the program, the split keys 111 stored in the split key storage unit may be updated. In this case, not only the split keys 111, but also the split key identification information table 200 and the split key information table 400, each of which indicates the relationship between the split key 111 and the signature key generation equation F21, need to be updated. It is also acceptable to update the program of the combined split key generation unit instead of updating the program of the signature key generation identical equation generation unit 120.

In this way, the updating server can adjust the numbers of split keys and combined split keys to be generated, which makes it possible to flexibly set the security level.

<Modifications>

While the present invention has been described in accordance with the specific embodiments outlined above, it is evident that the present invention is not limited to such. The following cases are also included in the present invention.

(1) Specifically, each of the above-described devices is a computer system comprising a microprocessor, a ROM, a RAM, a hard disk unit, a display unit, a keyboard, a mouse and the like. A computer program is stored either in the RAM or in the hard disk unit. Each of the devices achieves its functions by the microprocessor operating in accordance with the computer program that is read into the RAM. Here, the computer program is a combination of a plurality of instruction codes that give instructions to a computer, so that the computer can perform predetermined functions.

(2) All or part of the components constituting each of the above described devices may be one piece of system LSI (Large Scale Integration). A system LSI is a super multifunctional LSI manufactured by integrating multiple structural units onto a single chip. Specifically, it is a computer system including a microprocessor, ROM, RAM and the like. The RAM stores the computer program. The system LSI achieves its functions when the microprocessor operates in accordance with the computer program. Each of the component parts of the above described devices may be made into one chip individually, or may also be made into one chip so as to include part or all of the components.

Note that the system LSI may be referred to as an IC, an LSI, a super LSI or an ultra LSI in accordance with the degree of integration.

In addition, a method for integrating circuits is not limited to an LSI, and may be realized by an application specific integrated circuit or a versatile processing unit. It is possible to use an FPGA (Field Programmable Gate Array) that is programmable after the LSI is produced, or a silicon figurable processor that can restructure the connection and setting of circuit cells in the LSI.

In addition, if a technology of integrating that can substitute for the LSI appears by a progress of semiconductor technology or another derivational technology, it is possible to integrate the function blocks by using the technique. A possible field for integrating the function blocks can be an adaptation of biotechniques.

(3) In the first embodiment, the split key identification information table 200 and the split key information table 400 are written by the split key generation device 22. However, it is apparent that these tables 200 and 400 may be generated in the signature generation device 100.

Note that the signature key generation equation F21 may be specified from the content of the split key information table 400 by an unauthorized analysis. Therefore, as a safer implementation method, the split key information table 400 may be stored in a state of being encrypted, and decrypted only at the time of the signature generation. This makes it difficult to specify the signature key generation equation F21 by using the static analysis, and improves security. Furthermore, when the signature key generation equation F21 is not specified, the signature key d is also difficult to be specified.

(4) The present embodiments provide the description of a case of generating the signature key generation identical equation before generating the combined split keys corresponding to thereto. However, it is not limited to such. Any processing step is acceptable as long as the signature key generation identical equation and the combined split keys are generated.

For example, it is possible to randomly generate the combined split keys first, and then generate the signature generation identical equation that includes a part corresponding to the combined split keys.

(5) Part or all of the components of the above described devices may be structured as a removable IC card or a stand-alone module. Each of the IC card and the module is a computer system including a microprocessor, ROM, RAM and the like. Each of the IC card and the module may also include the above super multifunctional LSI. The IC card and the module achieve their functions by the microprocessor operating in accordance with the computer program. The IC card and module may be tamper resistant.

(6) The present invention may be the methods shown above. Also, the present invention may be computer programs for causing computers to realize the methods, or may be digital signals representing the computer programs.

Also, the present invention may be a computer-readable recording medium on which the computer programs or the digital signals are recorded such as a flexible disk, a hard disk, a CD-ROM, an MO, a DVD, a DVD-ROM, a DVD-RAM, a BD (Blu-ray Disc), and a semiconductor memory. The present invention may be the digital signals which are recorded on the above described recording media.

Also, the present invention may be the computer programs or digital signals which are transmitted via an electronic communication circuit, a wireless or fixed-line communication circuit, a network acting as the Internet, a data broadcast and the like.

Also, the present invention may be a computer system including a microprocessor and a memory, whereby the memory stores the computer program, and the microprocessor operates in accordance with the computer program.

Also, the present invention may be carried out by another independent computer system by transferring the program or the digital signals which have been recorded on the recording media, or by transferring the program or the digital signals via the network and the like.

(7) The above embodiments and the above modifications may be combined.

(8) The terminology "commutative law", "distributive law", "associative law", and "reverse polish notation" is simply known terminology recited for the record, and these recitations are not intended to newly define such terminology."

INDUSTRIAL APPLICABILITY

The secure processing device and method according to the present invention have an advantageous effect of performing secure processing without revealing the confidential information during the execution of the program, since the confidential information is derived from a calculation result of only the split confidential information. The secure processing device and method also have an advantageous effect of dynamically generating different pieces of split confidential information every time the secure processing using the confidential information is executed, and dynamically changing the execution flow of the secure processing, thereby making the dynamic analysis of an unauthorized analyst difficult. Therefore, the secure processing device and method are useful in the fields of software and such that perform processing using confidential information that is disadvantageous if leaked to an unauthorized analyst.

The invention claimed is:

1. A secure processing device that performs an operation equivalent to a secure operation performed on a message using a secret key, and that obtains a same operation result as the secure operation, the secure processing device comprising:
    a microprocessor; and
    a non-transitory memory storing thereon executable instructions, which when executed by the microprocessor, cause the secure processing device to function as:
    a storage unit that stores (i) a plurality of split keys obtained by splitting the secret key, and (ii) a first secret key generation equation for calculating the secret key with use of the plurality of split keys as arguments input to the first secret key generation equation, the first secret key generation equation including an operation including at least one arithmetic operation;
    a combined key generation unit operable to generate a plurality of combined keys, each of which is obtained by performing an operation on at least one of the split keys;
    a generation unit operable to generate a second secret key generation equation (i) that is equivalent to the first secret key generation equation, (ii) that takes the plurality of combined keys as arguments, and (iii) that is for performing a secure operation on the message with use of the plurality of combined keys, the second secret key generation equation including an operation including at least one arithmetic operation; and
    an executing unit operable to perform the secure operation on the message with use of the plurality of combined keys based on the second secret key generation equation, wherein the plurality of combined keys and the second secret key generation equation are dynamically generated before the secure operation is performed on the message, so that the plurality of combined keys and the second secret key generation equation are not always the same,
    wherein the storage unit stores the plurality of split keys as groups of split keys, and
    wherein the generation unit generates the second secret key generation equation by (i) randomly shuffling each of the groups of split keys stored in the storage unit using a commutative law, (ii) randomly splitting of the split keys included in each of the groups of split keys that have been randomly shuffled using an associative law, and (iii) transforming each of the groups of split keys that have been randomly split into a data structure, randomly selecting parts of the data structure to be combined, and combining the selected parts to generate the second secret key generation equation that is equivalent to the first secret key generation equation using a distributive law.

2. The secure processing device of claim 1,
    wherein the first secret key generation equation includes one or more operations,
    wherein each of the one or more operations, included in the first secret key generation equation, includes (i) a plurality of operands and (ii) an operator indicating a type of an operation between the operands,
    wherein the storage unit stores attribute information for each of the operations included in the first secret key generation equation, the attribute information indicating a relationship between the plurality of operands and the operator, and
    wherein the generation unit generates the second secret key generation equation with use of the attribute information.

3. The secure processing device of claim 2,
    wherein, in the first secret key generation equation, values of the arguments are input as the operands, each of the values corresponding to a different one of the plurality of split keys,
    wherein the attribute information indicates an operator that corresponds to a plurality of operands capable of being combined, and
    wherein the combined key generation unit is operable to generate the combined keys by combining split keys corresponding to the combined operands.

4. The secure processing device of claim 1, wherein the second secret key generation equation includes one or more operations, each of the one or more operations including (i) a plurality of operands and (ii) an operator indicating a type of an operation between the operands, and
    wherein the storage unit stores attribute information for each of the one or more operations included in the second secret key generation equation, the attribute information indicating a relationship between the plurality of operands and the operator.

5. The secure processing device of claim 1,
    wherein the generation unit further generates random number information, and thereby generates the second secret key generation equation including the random number information, and wherein the executing unit perform the secure operation on the message using the plurality of combined keys and the random number information.

6. The secure processing device of claim 1, wherein the generation unit further generates, with use of the secret key, redundant information that does not affect a result of the secure operation processing, and thereby generates the second secret key generation equation using the redundant information.

7. The secure processing device of claim 1, wherein the storage unit stores dummy information, which is not used by the executing unit, together with the plurality of split keys.

8. The secure processing device of claim 1, wherein the secret key is a signature key for generating a digital signature, and
wherein the secure operation is a signature generation operation for providing a digital signature on the message.

9. The secure processing device of claim 8, wherein the signature generation processing is RSA (Rivest Shamir Adleman) signature generation processing.

10. The secure processing device of claim 8, wherein the signature generation processing is performed using an elliptic curve digital signature method.

11. The secure processing device of claim 10, wherein the executed executable instructions further cause the secure processing device to function as
a random number information generation unit operable to generate random number information,
wherein the executing unit performs (i) processing for calculating a random value k scalar multiplication point of a base point P that is an order q of an elliptic curve on a field of definition GF(p) in the elliptic curve digital signature method, and (ii) processing that uses a value of an inverse of k on the field of definition GF(q), without directly using the random number k, but using at least two pieces of random number information.

12. The secure processing device of claim 1, wherein the secret key is a secret key for public key encryption, and
wherein the executing unit performs, as the secure operation, processing of a public key encryption system using a public key and the secret key.

13. The secure processing device of claim 12, wherein the public key encryption is RSA encryption.

14. The secure processing device of claim 12, wherein the public key encryption is elliptic curve encryption.

15. The secure processing device of claim 1, wherein the executed executable instructions further cause the secure processing device to function as:
an acquiring unit operable to acquire, from outside, data for updating the generation unit; and
an updating unit operable to update the generation unit with use of the data for updating.

16. The secure processing device of claim 1, wherein the executed executable instructions further cause the secure processing device to function as:
an acquiring unit operable to acquire, from outside, at least one split key for updating;
an updating unit operable to update at least one of the plurality of split keys stored in the storage unit using the at least one split key for updating acquired by the acquiring unit.

17. A secure processing method used in a secure processing device that performs an operation equivalent to a secure operation performed on a message using a secret key, and that obtains a same operation result as the secure operation, wherein the secure processing device includes a storage unit that stores (i) a plurality of split keys obtained by splitting the secret key, and (ii) a first secret key generation equation for calculating the secret key with use of the plurality of split keys as arguments input to the first secret key generation equation, the first secret key generation equation including an operation including at least one arithmetic operation, the secure processing method comprising:
generating a plurality of combined keys, each of which is obtained by performing an operation on at least one of the split keys;
generating a second secret key generation equation (i) that is equivalent to the first secret key generation equation, (ii) that takes the plurality of combined keys as arguments, and (iii) that is for performing a secure operation on the message with use of the plurality of combined keys, the second secret key generation equation including an operation including at least one arithmetic operation; and
performing the secure operation on the message with use of the plurality of combined keys based on the second secret key generation equation,
wherein the plurality of combined keys and the second secret key generation equations are dynamically generated before the secrete operation is performed on the message, so that the plurality of combined keys and the second secret key generation equation are not always the same,
wherein the storage unit stores the plurality of split keys as groups of split keys, and
wherein the second secret key generation equation is generated by (i) randomly shuffling each of the groups of split keys stored in the storage unit using the commutative law, (ii) randomly splitting of the split keys included in each of the groups of split keys that have been randomly shuffled using the associative law, and (iii) transforming each of the groups of split keys that have been randomly split into a data structure, randomly selecting parts of the data structure to be combined, and combining the selected parts to generate the second secret key generation equation that is equivalent to the first secret key generation equation using the distributive law.

18. A non-transitory computer readable recording medium having stored thereon a computer program used in a secure processing device that performs an operation equivalent to a secure operation performed on a message using a secret key, and that obtains a same operation result as the secure operation, the secure processing device comprising, wherein the secure processing device includes a storage unit that stores (i) a plurality of split keys obtained by splitting the secret key, and (ii) a first secret key generation equation for calculating the secret key with use of the plurality of split keys as arguments input to the first secret key generation equation, the first secret key generation equation including an operation including at least one arithmetic operation, and wherein, when executed, the computer program causes the secure processing device to perform a method comprising:
generating a plurality of combined keys, each of which is obtained by performing an operation on at least one of the split keys;
generating a second secret key generation equation (i) that is equivalent to the first secret key generation equation, (ii) that takes the plurality of combined keys as arguments, and (iii) that is for performing a secure operation on the message with use of the plurality of combined keys, the second secret key generation equation including an operation including at least one arithmetic operation; and performing the secure operation on the message with use of the plurality of combined keys based on the second secret key generating equation, wherein the plurality of combined keys and the second secret key generation equation are dynamically generated before the secure operation is performed on the message, so that the plurality of combined keys and the second secret key generation equation are not always the same, wherein the storage unit stores the plurality of split keys as groups of split keys, and wherein the second secret key generation equation is generated by (i) randomly shuffling each of the groups of split keys stored in the storage unit using the commutative law, (ii) randomly splitting of the split keys included in each of the groups of split keys that have been randomly shuffled using the associative law, and (iii) transforming each of the groups of split keys that have been randomly split into a data structure, randomly selecting parts of the data structure to be combined, and combining the selected parts to generate the second secret key generation equation that is equivalent to the first secret key generation equation using the distributive law.

19. An integrated circuit that performs an operation equivalent to a secure operation performed on a message using a secret key, and that obtains a same operation result as the secure operation, the integrated circuit comprising:

a microprocessor; and a non-transitory memory storing thereon executable instructions, which when executed by the microprocessor, cause the integrated circuit to function as:

a storage unit that stores (i) a plurality of split keys obtained by splitting the secret key, and (ii) a first secret key generation equation for calculating the secret key with use of the plurality of split keys as arguments input to the first secret key generation equation, the first secret key generation equation including an operation including at least one arithmetic operation;

a combined key generation unit operable to generate a plurality of combined keys, each of which is obtained by performing an operation on at least one of the split keys;

a generation unit operable to generate a second secret key generation equation (i) that is equivalent to the first secret key generation equation, (ii) that takes the plurality of combined keys as arguments, and (iii) that is for performing a secure operation on the message with use of the plurality of combined keys, the second secret key generation equation including an operation including at least one arithmetic operation; and an executing unit operable to perform the second secure operation procedure on the message with use of the plurality of combined keys based on the second secret key generation equation, wherein the plurality of combined keys and the second secret key generation equation are dynamically generated before the secure operation is performed on the message, so that the plurality of combined keys and the second secret key generation equation are not always the same, wherein the storage unit stores the plurality of split keys as groups of split keys, and wherein the generation unit generates the second secret key generation equation by (i) randomly shuffling each of the groups of split keys stored in the storage unit using the commutative law, (ii) randomly splitting of the split keys included in each of the groups of split keys that have been randomly shuffled using the associative law, and (iii) transforming each of the groups of split keys that have been randomly split into a data structure, randomly selecting parts of the data structure to be combined, and combining the selected parts to generate the second secret key generation equation that is equivalent to the first secret key generation equation using the distributive law.

* * * * *